United States Patent
Chidambaran et al.

(10) Patent No.: US 10,773,985 B2
(45) Date of Patent: *Sep. 15, 2020

(54) METHOD AND APPARATUS FOR SELENIUM REMOVAL FROM HIGH TDS WASTEWATER

(71) Applicant: Aquatech International, LLC, Canonsburg, PA (US)

(72) Inventors: Ravi Chidambaran, Canonsburg, PA (US); Pavan Raina, Pune (IN); Nitin Chandan, Pune (IN); Dhairyasheel Toraskar, Pune (IN); Narendra Singh Bisht, Pune (IN)

(73) Assignee: Aquatech International, LLC, Canonsburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/201,397

(22) Filed: Nov. 27, 2018

(65) Prior Publication Data

US 2019/0092667 A1 Mar. 28, 2019

Related U.S. Application Data

(63) Continuation of application No. 15/433,894, filed on Feb. 15, 2017, now Pat. No. 10,173,914.

(30) Foreign Application Priority Data

Feb. 15, 2016 (IN) .............................. 201611005215

(51) Int. Cl.
*C02F 3/34* (2006.01)
*C02F 9/00* (2006.01)
(Continued)

(52) U.S. Cl.
CPC ................ *C02F 3/34* (2013.01); *C02F 1/001* (2013.01); *C02F 1/4676* (2013.01); *C02F 1/66* (2013.01);
(Continued)

(58) Field of Classification Search
CPC .... C02F 1/66; C02F 9/00; C02F 1/001; C02F 1/4676; C02F 2101/101; C02F 2101/106; C02F 2101/163
See application file for complete search history.

(56) References Cited

U.S. PATENT DOCUMENTS 6,183,644 B1  2/2001 Adams et al.
7,550,087 B2  6/2009 Peeters et al.
(Continued)

FOREIGN PATENT DOCUMENTS

CN  103951120 A  7/2014
RU  2172209 C1   8/2001
(Continued)

OTHER PUBLICATIONS

PCT/US2017/017986, "International Search Report Received".
(Continued)

*Primary Examiner* — Ana M Fortuna
(74) *Attorney, Agent, or Firm* — Buchanan Ingersoll & Rooney PC

(57) ABSTRACT

A process for removal of selenium and nitrate from waste water includes both electrochemical and bioprocessing treatment. Embodiments include use of activated walnut shell a growth media for selenium-reducing bacteria.

12 Claims, 28 Drawing Sheets

Fig.2 A broad typical flow scheme for the integrated process

(51) Int. Cl.
*C02F 1/00* (2006.01)
*C02F 1/467* (2006.01)
*C02F 1/66* (2006.01)
*C02F 3/10* (2006.01)
*C02F 3/30* (2006.01)
*C02F 3/06* (2006.01)
*C02F 101/10* (2006.01)
*C02F 101/16* (2006.01)
*C02F 101/20* (2006.01)
*C02F 103/10* (2006.01)
*C02F 103/18* (2006.01)

(52) U.S. Cl.
CPC .............. *C02F 3/10* (2013.01); *C02F 9/00* (2013.01); *C02F 3/06* (2013.01); *C02F 3/105* (2013.01); *C02F 3/30* (2013.01); *C02F 2101/101* (2013.01); *C02F 2101/106* (2013.01); *C02F 2101/163* (2013.01); *C02F 2101/20* (2013.01); *C02F 2103/10* (2013.01); *C02F 2103/18* (2013.01); *C02F 2303/16* (2013.01); *C02F 2305/06* (2013.01); *Y02W 10/15* (2015.05)

(56) References Cited

U.S. PATENT DOCUMENTS

| | | | |
|---|---|---|---|
| 7,790,034 | B2 | 9/2010 | Peeters et al. |
| 8,163,181 | B2 | 4/2012 | Peeters et al. |
| 8,425,775 | B2 | 4/2013 | Post et al. |
| 8,557,118 | B2 | 10/2013 | Kain et al. |
| 10,173,914 | B2 * | 1/2019 | Chidambaran .......... C02F 9/00 |
| 2007/0278150 | A1 | 12/2007 | Lupton et al. |
| 2011/0253634 | A1 | 10/2011 | Soane et al. |
| 2011/0290666 | A1 | 12/2011 | Vogler et al. |
| 2011/0290733 | A1 | 12/2011 | Vogler et al. |
| 2011/0297616 | A1 | 12/2011 | Hughes et al. |
| 2012/0024798 | A1 | 2/2012 | Pickett et al. |
| 2012/0152761 | A1 | 6/2012 | Pickett et al. |
| 2013/0270181 | A1 | 10/2013 | Pickett et al. |
| 2014/0014586 | A1 | 1/2014 | Soane et al. |
| 2014/0209526 | A1 | 7/2014 | Pickett et al. |
| 2015/0034552 | A1 | 2/2015 | Pickett et al. |
| 2015/0151995 | A1 | 6/2015 | Pickett et al. |
| 2016/0289092 | A1 | 10/2016 | Kratochvil et al. |
| 2017/0036935 | A1 | 2/2017 | Peterson et al. |
| 2017/0233272 | A1 | 8/2017 | Chidambaran et al. |
| 2018/0141835 | A1 * | 5/2018 | Canicio Bardolet ... C02F 1/008 |

FOREIGN PATENT DOCUMENTS

| | | |
|---|---|---|
| RU | 2206519 C2 | 6/2003 |
| RU | 2242059 C2 | 12/2004 |
| WO | 2012018442 A2 | 2/2012 |

OTHER PUBLICATIONS

PCT/US2017/017986, "Written Opinion Received".
Sandy, at al., "Review of Available Technologies for the Removal of Selenium from Water", Jun. 2010, North American Metals Council. pp. 1-233.
Smith, "Evaluation of Treatment Techniques for Selenium Removal", IWC Paper 09-05, pp. 75-92.
Sonstegard, et al., "Full Scale Operation of GE ABMet Biological Technology for the Removal of Selenium from FGD Wastewaters," pp. 1-11.

* cited by examiner

Fig.2 A broad typical flow scheme for the integrated process

Fig.3 Flow scheme : Method-I

Fig.4 Flow scheme : Method-II

Fig.5 Electrochemical treatment system : For preconditioning of wastewater

Fig.7 SEM of internal layered structure of media

Fig.8 ORP study of Untreated and Treated Media

Fig.9 Media before and after treatment

Fig.10 Untreated and Treated Media

Fig.11 Media activation and oxide removal

Fig.12 Treated and Activated Media

Fig.13A Flow scheme with single stage biological process

Fig. 13B A flow scheme of multistage biological process

Permeate or Vacuum pump

1. Bioreactor/Membrane tank
2. Flat sheet membrane module
3. Air diffuser
4. Permeate pump Fig.14 Flow scheme of post treatment method Fig.15 Selenium reduction plot in example-1

Fig.16 A plot of effect of velocity on selenium reduction

Fig.17 Backwash sludge image

Fig.18 Dried backwash sludge image

Fig.19 Image of Fresh and Activated Media

Fig.20 A plot of nitrate reduction in example-2

Fig.21 A plot of oxidation reduction potential in example-3

Fig.22 Nitrate removal plot in FGD character wastewater

Fig.23 Selenium removal plot in FGD character wastewater

Fig.24 Nitrite removal in FGD character wastewater

Fig.25 Sulfate removal plot in FGD character wastewater

Fig.27 A plot of selenium reduction in ECT process

METHOD AND APPARATUS FOR SELENIUM REMOVAL FROM HIGH TDS WASTEWATER

CROSS-REFERENCE TO RELATED APPLICATIONS

This application claims priority to Indian Application No. 201611005215, filed on Feb. 15, 2016. That application is incorporated by reference as if fully rewritten herein.

BACKGROUND OF THE INVENTION

Field of the Invention

Embodiments relate to removal of nitrate and selenium and other contaminants from wastewater by an integrated process comprising of an electro chemical and biological process, using porous support media as bio-film carrier.

Background of the Related Art

Selenium is widely distributed throughout most soil and natural water. As regulatory limits become more stringent, selenium presents a significant challenge to wastewater treatment. As with any constituent that is present in water at low concentration, it is difficult to consistently achieve low concentration of contaminants in the effluent.

Many different technologies are applied for selenium reduction from wastewater. Very few of them can achieve a desired level of selenium reduction consistently. Each core selenium treatment technology is generally a part of several other treatment technologies or unit processes that form an overall treatment system. This is especially the case when target discharge requirement are less than 10 µg/L. These technologies include physical separation by different membranes, evaporation pond method, chemical treatment, enzymatic reduction, and biological reduction methods, all of which are applied for removal of selenium.

Physical separation methods include membrane filtration and evaporation. Nano-filtration and reverse osmosis are applied for selenium removal. In the case of nano-filtration, pore sizes are similar to the sizes of selenite or selenate oxyanions. Therefore, depending on the exact molecular weight cut off, performance may not be effective.

Reverse osmosis has been demonstrated at full scale to remove selenium. It can remove high levels of total dissolved salt and produce consistent high water quality. Reverse osmosis processes have some disadvantages. They demand high capital cost and operational cost, they have a superior pretreatment requirement to meet membrane tolerance, and they have a higher feed pressure requirement due to higher background total dissolved solids (TDS). Brine concentrators require exotic metallurgy due to high chloride content and become relatively expensive and also generate selenium rich concentrate, which should be either crystallized or sent to evaporation ponds. The main disadvantages of an evaporation pond technique are large space requirements and ineffectiveness in areas of cold climate. Furthermore, evaporation results in a net loss of water and can be concern to areas with scarce of water source. (See "Review of available technologies for the removal of selenium from water," prepared for North American Metal Council, 2010 Final Report, which is incorporated by reference herein.)

There are three predominant chemical treatment mechanisms by which soluble selenium can be removed from water. Those are precipitation, adsorption, and oxidation/reduction. Adsorption, which utilizes different adsorptive media, is not able to remove selenium to permitted regulatory levels. Other chemical methods like zero-valent iron (ZVI) and catalytic reduction have not been demonstrated to be effective at full-scale plants.

Biological treatment of selenium containing wastewater has been an area of interest, particularly for treatment of high Total Dissolved Solids wastewater. One high TDS wastewater is Flue Gas Desulfurization scrubber blowdown (FGD) wastewater and wastewater generated by the mining industry. In general, biological treatment offers a low-cost alternative to more expensive physical and chemical treatment. Reduction of both nitrate and selenate/selenite takes place at a reduced oxidation-reduction potential (ORP). Biological systems catalyze the reduction of nitrate and selenium. Nitrate gets reduced to inert nitrogen gas while Selenate can be reduced to selenite and both selenate and selenite can be further reduced to elemental selenium. The Nitrogen gas formed gets release in the environment while elemental selenium which is insoluble in water can be removed by solid liquid separation and then disposed of.

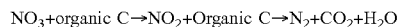

$NO_3$+organic C→$NO_2$+Organic C→$N_2$+$CO_2$+$H_2O$

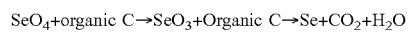

$SeO_4$+organic C→$SeO_3$+Organic C→Se+$CO_2$+$H_2O$

Oxidation-reduction potential range for the reduction of different oxyanion is shown in Table 1.

TABLE 1

| Oxidation- Reduction potential range | | |
|---|---|---|
| Final electron acceptor | Approximate ORP (mV) | Process |
| Nitrate/Nitrite | 0 to −50 | De-nitrification |
| Selenate/Selenit | −50 to −200 | Selenium Reduction |
| Sulfate | −100 to — | Sulfate Reduction |

Selenium and nitrate reducing bacteria (FIG. 1) are considered heterotopic; they utilize organic carbon as their electron donor and nitrate, selenate/selenite as their electron acceptors.

To reduce selenium in wastewater, oxygen and nitrate must be reduced. If a significant amount of nitrate is present in water, then a sufficient amount of organic carbon needs to be added to reduce nitrate and selenium. This means that the environment must be controlled to exclude oxygen, and that there must be enough electron donors available to reduce selenium and nitrate to treat wastewater for selenium.

Some examples of carbon sources utilized in reduction of nitrate and selenium include glucose, methanol, acetate, citric acid, molasses, etc. In case of very low concentrations of nitrate and selenium in the wastewater, use of biological treatment processes becomes challenging. Such conditions will result in little or no growth of heterotrophic bacteria, which can lead to washout or potential loss of the microorganism. If electron donors are added in absence of nitrate, selenate, the system could promote sulfate reduction, hydrogen production or even methane generation. Sulfate can also be reduced where selenium gets reduced but sulfate reduction is being carried out by an entirely different group of bacteria. The growth of selenium reducing bacteria is influenced by the pH and temperature of the environment in which bacteria are growing. The best pH range for selenate and selenite reduction is 6.5 to 9.5. Most biological systems for wastewater treatment operate with mesophilic bacteria, or bacteria that operate in the range of 15° C. to 40° C.

Biological processes for selenium removal are widely used. There are certain commercial available technologies that are based on biological processes. (See, e.g., U.S. Pat.

Nos. 6,183,644 and 7,550,087, both of which are incorporated by reference herein.). Use has been demonstrated in large-scale plants as well. Some of them use attached growth process and other uses suspended growth process. The main drawback of current technologies is that they require high residence time of 4 to 6 hours. They are also highly sensitive to operating conditions and lack of steady ORP control. As the whole biological process depends upon oxidation and reduction potential, it is very important to maintain it even with changing feed water characteristics. Also, in an attached growth process, there is a possibility that the process may get disturbed if sludge gets washed out from the reactor. It is important that the bio-film formed over the media surface remains intact and does not wash out. There is a possibility that bio-culture may wash out from the system during operation or during periodic backwash. If media does not hold the bio-film, it will affect the consistency of the process.

BRIEF SUMMARY OF THE INVENTION

There is a need for a process that can give a stable performance with respect to change in feed water characteristics, and that can be operated at low hydraulic retention time (HRT) to reduce the footprint of the installation. Such a process should provide a methodology for preconditioning of the wastewater due to presence of oxygen radicals or highly oxygenated compounds. A process also should provide post treatment methods to ensure consistency of product and meet or exceed the quality objectives.

Embodiments of the invention may, but are not required to, meet one or more of the following objectives:
1. To devise an integrated process to treat selenium, nitrate and other heavy metals, which can perform consistently with varying feed water conditions.
2. To come up with a preconditioning process to bring ORP of feed water consistently in a desired range as it may contain highly oxygenated or oxygen radical compounds. This process would provide steady state conditions for downstream biological processing.
3. To devise a biological process for removal of selenium and nitrate from high TDS wastewater. The biological process could operate with minimum changes in feed water conditions. Multiple kinds of bacteria may be included as a mixed culture, or a single type of bacteria may be used.
4. To reduce hydraulic retention time of biological processing and reduce overall footprint of the treatment apparatus.
5. To develop a post treatment technique to remove any carryover of carbon source.

Present invention provides method for reduction of nitrate and selenium oxides from high TDS wastewater by biological path. The objective of the present invention is to provide a novel method of treatment of wastewater having selenium and nitrate contaminants. The process described in present invention consists of is following anoxic and anaerobic route for removal of contaminants from wastewater.

Preconditioning is the first step of the direct feed that can be fed in biological system. Preconditioning is primarily to remove suspended solids, inorganic precipitated salts followed by ORP adjustment to suit the feed for biological operation. The raw water available generally contains highly oxygenated compounds or oxygen radical generating compounds (High ORP) value, which requires to be conditioned initiated for biological anoxic reactions. The present invention provides method of treatment for HIGH ORP adjustment of the feed water. In some embodiments the preconditioning is able to proceed without the addition of lime, which may help to distinguish certain embodiments from the prior art. In other embodiments, lime may be used for pH adjustment, particularly downstream of the preconditioning process. In further embodiments no specific softening of the water is required, and none is conducted prior to biological processing. However some minor and incidental hardness reduction may happen due to the preconditioning processes.

An electrochemical treatment (ECT) process is a part of invention for adjustment of high ORP. ECT is operated under the influence of dc voltage applied across a set of electrodes that creates an environment where ORP is reduced to 0 to −150 mV and more specifically 0 to −50 mv. In this process de saturation of saturated inorganic salts also takes place while precipitating and removing some heavy metals. The precipitated salts are filtered through a clarifier or filter and the filtrate with ORP control is sent to the downstream biological process. The application of electro chemical process for this application is unique and efficient and improves the performance of integrated process in general and biological process in particular.

The media used in the biological process reported herein acts as a biofilm carrier. After activation of the media, a biofilm is formed on the highly porous biological media over its surface and in its internal structure. The natural polymeric constituent in the media not only provides physical space for a bioculture to develop over the surface, but also keeps the biofilm intact and the biofilm remains attached to the media.

Media used in embodiments of the present invention can be used in untreated form or with some treatment (i.e. in treated form) to enhance its efficiency. The treated media gives advantage of lower activation time as compared to the untreated media. The media is packed in columns and the same are used for removal of selenium and nitrate from high TDS wastewater. Depending on the level of contaminants a single column or multiple columns in series may be used to remove nitrate and selenium simultaneously from the wastewater within a HRT of 20 minutes to 120 minutes, typically 30 minutes to 60 minutes. Simultaneous removal is believed to be distinct from the sequential removal of selenium and nitrates that has been reported for some methods. Media types may be used alone or in combination. Suitable media types include but are not limited to almond shell, walnut shell, peanut shell, activated carbon, and gravel.

An optimized quantity (typically 100-400 PPM) of carbon source is supplied as electron donor to the oxides of selenium and nitrogen present in wastewater. The activation happens in the process, as bacteria find suitable environment to grow within the media. A biofilm is formed within the void space and over its surface, which actively participates in the biological process. Water having contamination like nitrate and selenium, when passed through the activated media column or vessel under pressure (typically 15 to 50 PSI, sometimes 10-15 PSI) results in nitrate converting to nitrogen gas, sulfate converting to hydrogen sulfide and selenate/selenite converting to elemental selenium that is removed from columns as solids. The column(s) are backwashed periodically to remove organic sludge and elemental selenium formed during the reaction.

The product water that comes out from the columns is post-treated, (if the residual BOD/COD values are meeting the required discharge limits,) either through an aerobic or membrane process to treat fine suspended particles of sludge and/or selenium or soluble COD/BOD. The backwash water from the columns is treated by either coagulation or flocculation or any other suitable technique to settle the sludge and further recycle the filtered water back to the preconditioning step. The sludge is taken for landfill. A broad typical flow scheme for the integrated process is shown in FIG. 2.

Embodiments may provide method for simultaneous removal of selenium, nitrate, and heavy metals from wastewater, including treating wastewater containing selenite and selenate and nitrate, and, optionally, heavy metals, in at least one column, where column is packed with a porous media providing a surface for growth and maintenance of a biofilm upon and in the porous media, wherein the biofilm reduces selenite and selenate to form elemental selenium, and wherein the biofilm also reduces nitrate to form nitrogen gas; and backwashing the at least one column to remove the elemental selenium and precipitated heavy metals, and an excess biomass from the column, wherein said backwashing does not diminish bioactivity of the biofilm growing upon and in the porous media. Further embodiments include adding a carbon source to the wastewater upstream of the at least one column.

In some embodiments the porous media is walnut shell. The walnut shell may have a greater porosity than natural walnut shell resulting from modification of a structure of natural walnut shell. In some embodiments the greater porosity is a result of at least one of a chemical method, a physical method, and a biological method. In some embodiments the chemical method is treatment with an alkali.

Further embodiments include filtering the wastewater subsequent to treatment in the column. In some embodiments the filtering is accomplished by at least one of media filtering, membrane filtering, and aerobic biological process and membrane filtration. Some embodiments further include physical and/or chemical treatment of the wastewater prior to treatment in the column, wherein the physical treatment may be clarification and the chemical treatment may be pH adjustment and desaturation.

Embodiments may also include preconditioning the wastewater by a process including removing suspended solids from the wastewater; adjusting a pH of the wastewater to between 6.0 and 8.5; removing precipitated inorganic salts from the wastewater by filtration; electrochemically treating the wastewater to decrease the amount of at least one of oxygenated compounds and oxygen radicals, thereby reducing an oxidation reduction potential of the wastewater; and treating the wastewater in at least one of a clarifier and a filter.

In some embodiments 70-85% of selenium is removed from the wastewater in the electrochemical treatment. In some embodiments electrochemical treatment is conducted by an electrochemical treatment system including a feed tank, a pump, and an ECT module, said ECT module comprising an electrical voltage supply, static mixer, and clarifier. In some embodiments the oxidation reduction potential exiting the electrochemical process is reduced to less than but not including 0 mV. In some embodiments the electrochemical treatment operates at a current density between 5 A/m$^2$ and 30 A/m$^2$.

Still further embodiments may provide a method for preconditioning wastewater for biological removal of selenium and nitrate, including removing suspended solids from the wastewater; removing inorganic salts from the wastewater; adjusting a pH of the wastewater to between 6.0 and 8.5; removing precipitated inorganic salts from the wastewater by filtration electrochemically treating the wastewater to decrease the amount of at least one of oxygenated compounds and oxygen radicals, thereby reducing an oxidation reduction potential of the wastewater; and treating the wastewater in at least one of a clarifier and a filter.

In a further embodiment the electrochemical treatment is conducted by an electrochemical treatment system including a feed tank, a pump, and an ECT module, said ECT module including an electrical voltage supply, static mixer, and clarifier.

In further embodiments the electrochemical treatment operates at a current density between 5 A/m$^2$ and 30 A/m$^2$. In further embodiments the oxygen reduction potential exiting the electrochemical process is reduced to less than but not including 0 mV. A further embodiment comprises operating the electrochemical treatment in a polarity reversal mode.

In some embodiments the electrochemical treatment operates with at least one cathode and at least one anode, and wherein said at least one cathode and said at least one anode have the same composition. In some embodiments they have different compositions. In some embodiments the wastewater is flue gas desulfurization blowdown water from a power plant. In other embodiments the wastewater is mining industry water.

A further embodiment provides a method for treatment of wastewater from a flue gas desulfurization process, including providing wastewater from a flue gas desulfurization process, said wastewater comprising nitrate, selenite, selenate, and heavy metals; removing suspended solids from the wastewater; adjusting a pH of the wastewater to between 6.0 and 8.5; removing precipitated inorganic salts from the wastewater by filtration; electrochemically treating the wastewater to decrease the amount of at least one of oxygenated compounds and oxygen radicals, thereby reducing an oxidation reduction potential of the wastewater; treating the wastewater in at least one of a clarifier and a filter; treating wastewater containing selenite and selenate and nitrate, and, optionally, heavy metals, in at least one column, said column packed with a porous media providing a surface for growth and maintenance of a biofilm upon and in the porous media, wherein said biofilm reduces selenite and selenate to form elemental selenium, and wherein said biofilm also reduces nitrate to form nitrogen gas; backwashing said at least one column to remove the elemental selenium and precipitated heavy metals, and an excess biomass from the column, wherein said backwashing does diminish bioactivity of the biofilm growing upon and in the porous media; and performing at least one of discharging and recycling the treated wastewater.

A further embodiment includes filtering the wastewater subsequent to treatment in the column. A still further embodiment includes wherein the filtering is accomplished by at least one of media filtering, membrane filtering, and aerobic biological process and membrane filtration.

A further embodiment provides a method for treatment of wastewater from a mining process, including providing wastewater from a mining process, said wastewater comprising nitrate, selenite, selenite, and heavy metals; removing suspended solids from the wastewater; adjusting a pH of the wastewater to between 6.0 and 8.5; removing precipitated inorganic salts from the wastewater by filtration; electrochemically treating the wastewater to decrease the amount of at least one of oxygenated compounds and oxygen radicals, thereby reducing an oxidation reduction potential of the wastewater; treating the wastewater in at least one of a clarifier and a filter; treating wastewater containing selenite and selenate and nitrate, and, optionally, heavy metals, in at least one column, said column packed with a porous media providing a surface for growth and maintenance of a biofilm upon and in the porous media, wherein said biofilm reduces selenite and selenate to form elemental selenium, and wherein said biofilm also reduces nitrate to form nitrogen gas; backwashing said at least one column to remove the elemental selenium and precipitated heavy metals, and an excess biomass from the column, wherein said backwashing does diminish bioactivity of the biofilm growing upon and in the porous media; and performing at least one of discharging and recycling the treated wastewater. Some embodiments further include filtering the wastewater subsequent to treatment in the column. In some embodiments the filtering is accomplished by at least one of media filtering, membrane filtering, and aerobic biological process and membrane filtration.

In some embodiments the treatment in the column packed with a porous media has a hydraulic retention time between 30 and 60 minutes.

Further embodiments provide systems and apparatus configured to carry out any of the above methods.

DETAILED DESCRIPTION OF THE INVENTION

Figure 1:
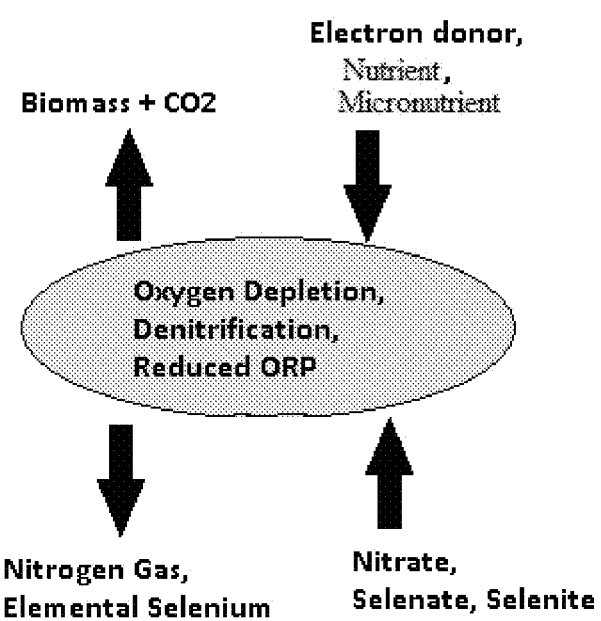
FIG. 1 shows a biological process for nitrate and selenium reduction.
Figure 2:
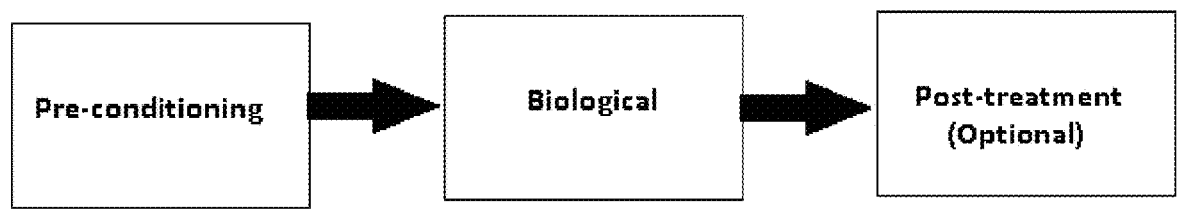
FIG. 2 shows a typical flow scheme for an integrated process according to an embodiment of the invention.

Biological reactors used in embodiments as presented herein are typically either suspended-growth or attached growth systems. A third type of acceptable system is a hybrid system that contains both suspended and attached growth.

Attached growth systems are preferred. The attached growth systems include a biofilm, or a layer of microorganisms that grow on the surface or void space of a solid phase media. Attached growth systems are more suitable for removal of dilute concentration of constituents than other systems. As microorganisms remain attached to the media for relatively longer periods of time, the chances of contact of constituent with microorganism significantly increase. The microorganisms in the attached growth process produce extra cellular polymers that allow them to firmly adhere to the media. In attached growth process for permanent biofilm formation, porosity of media also plays an important role.

A process for removal of selenium and nitrate from high TDS wastewater is described herein. The removal of oxyanion is based on biological fixed film process. Various types of media like almond shell, activated carbon, gravels, etc., can be used as adsorbent and biofilm carriers for the biological process, but they have proven unsatisfactory for reaching many desired levels of selenium removal.

After investigating several types and forms of media, we have surprisingly discovered one media that particularly suited for use in an attached growth process according to embodiments reported herein is walnut shell, which has provided unexpectedly good results relative to other media. This naturally occurring media has a bulk density of 600 to 1000 Kg/m$^3$. Its particle size is range from 0.5 to 5.0 mm, typically 1.0 to 2.5 mm. The inventive process makes the removal of oxyanion economical by using natural porous media to form biofilm over its surface and also in its internal structure. The attached growth biological process based on this media is very effective when dilute constituents are removed from the wastewater. It provides a large surface area and adequate contact time for the reaction to happen. Key features of embodiments of the present invention are (1) preconditioning of wastewater (2) application of walnut shell media for attached growth process (3) biological process operation with media (4) post treatment of out let from biological process. Note that some of these features may not be required in all embodiments of the invention, and the scope of the invention should be determined by the claims.

1. Preconditioning of Wastewater

Wastewater is preconditioned if the water contains suspended solids, high TDS, heavy metals and oxidizing constituents. Preconditioning is also used before the wastewater is sent through a biological process for removal of nitrates and selenium. Based on the level and type contamination in wastewater, selection of preconditioning steps can be done.

Figure 3:
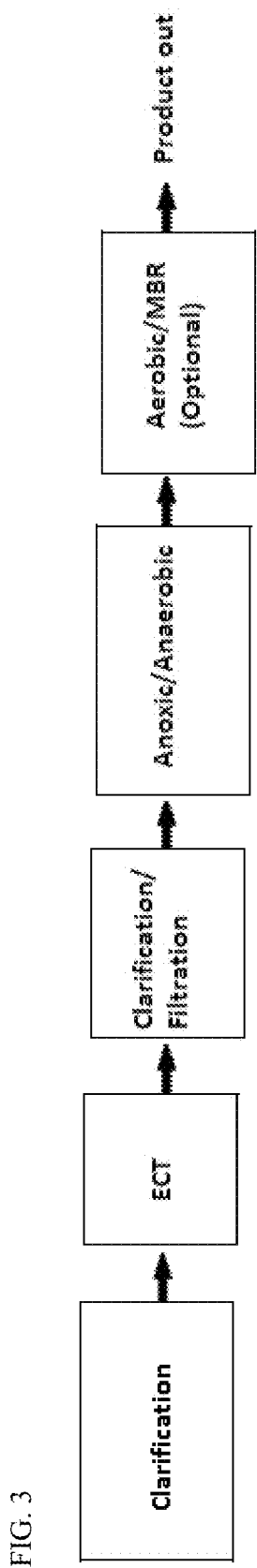
FIG. 3 shows a flow scheme of one embodiment of the invention.

To remove high levels of suspended solids in wastewater, to remove oxygenated compounds, and to reduce ORP of feed water, a method may apply clarification and pH adjustment followed by electrochemical treatment (ECT). The outlet of ECT after filtration enters the anoxic/anaerobic process, where selenium and nitrate get reduced. The product of the anoxic/anaerobic process is then treated through filtration or aerobic or membrane bioreactor process to remove excess COD/BOD and suspended solids. A flow scheme is shown in FIG. 3.

Figure 4:
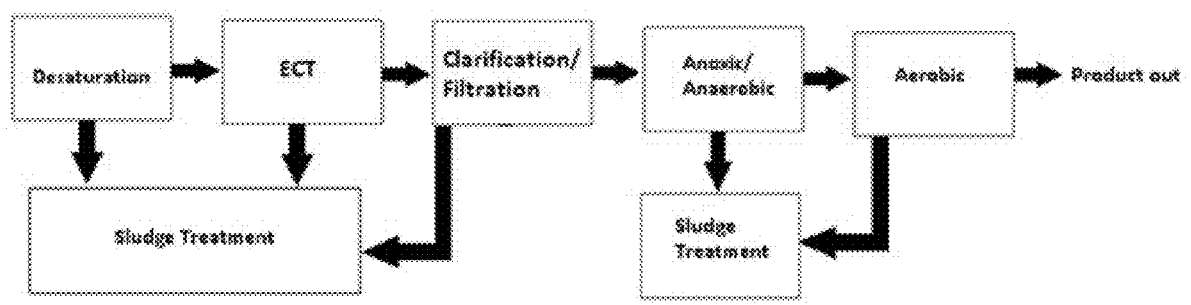
FIG. 4 shows a method for treatment of high TDS wastewater and oxygen-generating radicals.

In another case, embodiments of the present invention may also provide a method for treatment of high TDS wastewater, oxygen generating radicals, and other impurities. This method may include a de-saturation step to remove higher inorganic contamination like calcium/magnesium. Although not required, and in some embodiments specifically not used, softening is also optional at this point in some embodiments of the invention. This step is followed by ECT and biological process as shown in FIG. 4.

2. Preconditioning to Stabilize ORP of Wastewater

Oxidizing ions present in wastewater lead to high ORP and create fluctuations in the ORP values of biological processing. This disturbs the treated water quality. High amount of heavy metals also upset the process. The preconditioning of such wastewater by an (ECT) process reduces the ORP of wastewater in a negative range and minimizes the fluctuations in downstream biological processing. In a conventional biological process the performance is adversely impacted by variation in feed water quality in terms of ORP and lack of ORP control. Through the preconditioning achieved in the ECT process the biological process operates in steady state conditions ensuring superior performance and also improved efficiency of biological process in terms of lower HRT. It also helps in reduction of heavy metal loads.

Figure 5:
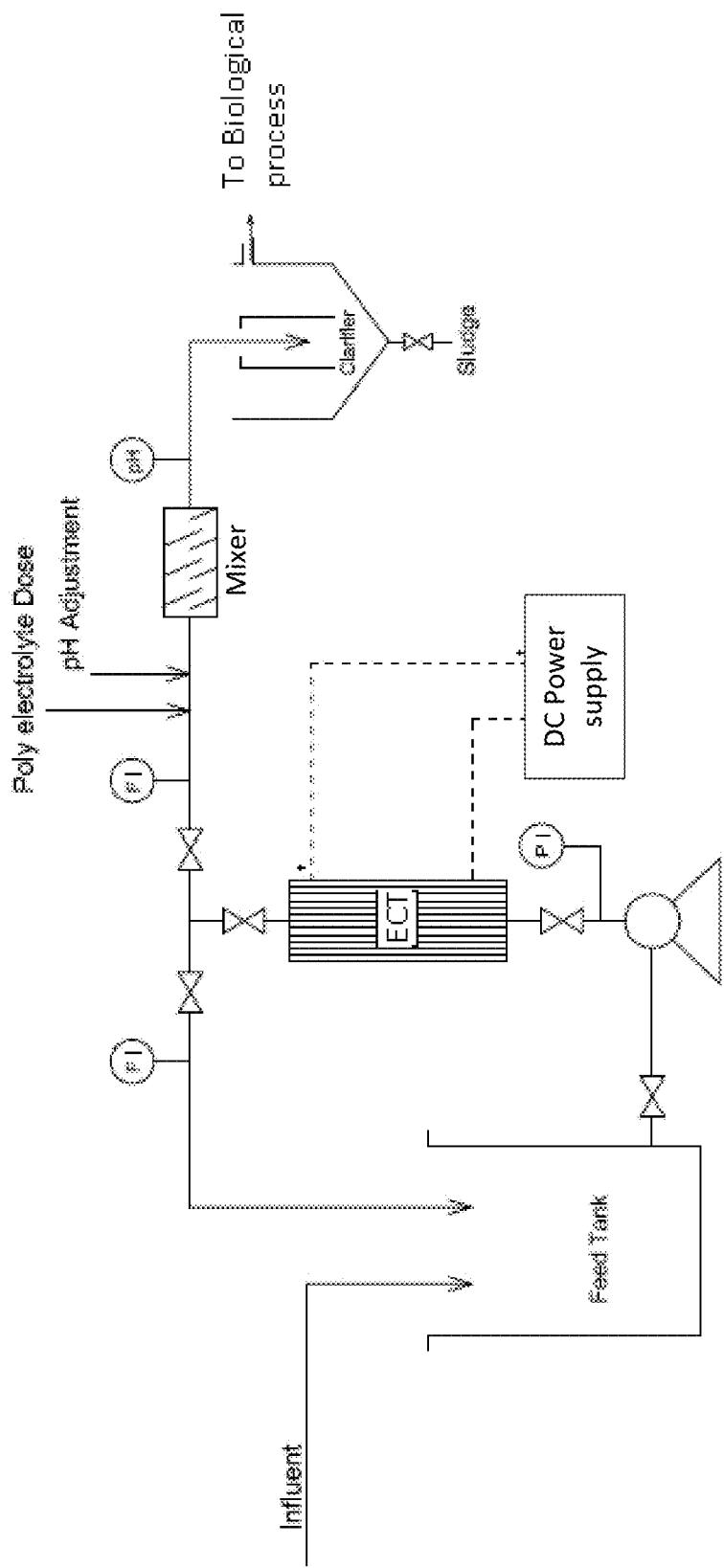
FIG. 5 shows an apparatus for preconditioning of wastewater according to an embodiment of the invention.

The preconditioning of such wastewater in an ECT system includes a feed water tank, ECT module and a clarifier (as shown, for example, in FIG. 5) upstream of biological processing. The ECT process can use different types of electrodes for example aluminum, titanium, and iron. These electrode materials can be interchangeably used for cathodes and anodes. The electrode material for cathode and anode can be of similar or different material; for example, one embodiment may use an aluminum anode and titanium cathode.

In one of the embodiments of this process, wastewater is first passed through ECT module that is consisting of aluminum electrodes and a DC current is applied through DC power supply to ECT module and a required current density is maintained to carry out the reaction. In ECT module anodic and cathodic reactions occur that adjusts the oxidizing constituents of wastewater and reduce the ORP value in a negative range. Simultaneously aluminum coagulants released from sacrificial electrodes form aluminum hydroxides flocks, which reduce selenium and absorb heavy metals of wastewater to reduce dissolved trace metal load at downstream system.

The sludge formed due to coagulation process in the ECT module is separated in a clarifier or a filter, and treated water is then fed into downstream biological process for further treatment of nitrates and selenium. The module can be operated in a once-through mode or a recirculation mode. In some embodiments, wastewater could be extremely scaling and therefore may need very careful handling. The novelty of this process is that it delivers unexpected performance for example normalizes ORP, de-saturates the water and also removes 70-85% Selenium and 15-20% arsenic. This reduces the overall load on biological process and also makes the biological process consistent and steady.

There are different ways to reduce scaling potential independently or in combination. These include, for example, use of anti-scalant, high cross flow velocity, and low current density in the ECT system. Preconditioning of water though an ECT process also helps in desaturation of ions like calcium, magnesium and sulfate without adding any additional unit operations. Desaturation results in removal of these components without a specific softening process. Without this desaturation the saturated constituents would eventually foul media in the biological process with any minor pH fluctuations. To further mitigate the scaling on electrodes in ECT, this process can also operate with reversal of the polarity on a periodical basis where cathode become anode and anode becomes cathode. The polarity reversal frequency can be adjusted based on the scaling potential of water from 2 minutes to 20 minutes.

The ECT system for preconditioning of wastewater typically includes a feed tank, pump and ECT module with DC rectifier, static mixer and clarifier. Influent waste water from feed tank is fed into ECT module with the help of pump at high velocity. DC current is applied through DC power supply. ECT module operates in recirculation mode and at a low current density in the range of 5 A/m$^2$ to 30 A/m$^2$, and most preferably between 10 A/m$^2$ to 15 A/m$^2$. After preconditioning in an ECT module, conditioned water flows through static mixer and clarifier. Before the static mixer, polyelectrolyte dosing is done for flocculation of sludge particles. pH adjustment in the range 6.5 to 7.5 is also done with the help of caustic solution or any other alkali. After clarification or filtration, conditioned water then goes to biological process for further treatment. It is clear that ECT process provides a stable water quality for the biological process.

3. Detailed Description of Media

In present invention, a walnut shell media is used to form biofilm over its surface. The media contains natural biopolymers, it makes covalent interaction with biofilm formed over the surface, and it remains intact within its structure. This media contains cellulose, hemicelluloses, hydroxyl naphtha-glucone, 1,4,5-trihydroxylnaphthalene, and lignin in its backbone.

Apart from these chemical compounds media also consist of water in the complex. Media is hygroscopic in nature and absorbs 8 to 14% of water under normal atmospheric conditions. A treatment of media helps to provide sufficient porosity and creates a suitable environment for immobilization of microbial cells. The heterotrophic denitrifying and sulfate reducing bacteria use a framework of hemicelluloses and lignin as suspension for biofilm. One example of a denitrifying and sulfate reducing bacterium is *Enterobacter taylorae*. Our results shows that de-nitrification and selenium reduction efficiency is very high with media used in present invention and reduction takes place at a lower HRT than previously enjoyed by selenium removal processes. In embodiments of the invention HRT may be from 20 minutes to 120 minutes, and more specifically from 30 minutes to 60 minutes.

Cellulose is wrapped in hemicelluloses and lignin. Cellulose is generally considered as polymer of glucose. It has crystalline and amorphous structure. Every glucose rings of cellulose has three active hydroxyls, one primary hydroxyl and two secondary hydroxyl groups. A free hydroxyl group of cellulose has strong affinity to absorb water molecule. Some water molecules absorbed by cellulose enter in amorphous regions and form the water bound by a hydrogen bond.

Figure 6:
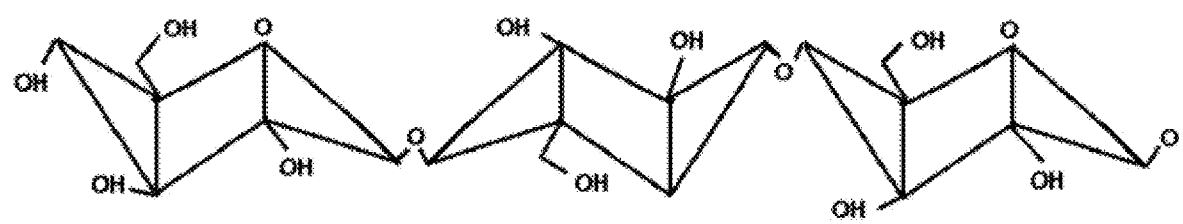
FIG. 6 shows the structure of cellulose

Molecules of bound water get attracted by the hydroxyl of cellulose and are arranged in certain directions to have density, making cellulose swell. The structure of cellulose is shown in FIG. 6 See "Literature review of physical and chemical treatment processes for Ligono cellulosic biomass" P H F, Hatsmen, W J J. Hujgen, R R C. Bakker, Chemical composition and structure of Natural Lignocellulose, 24-71, incorporated by reference herein.

Figure 7:
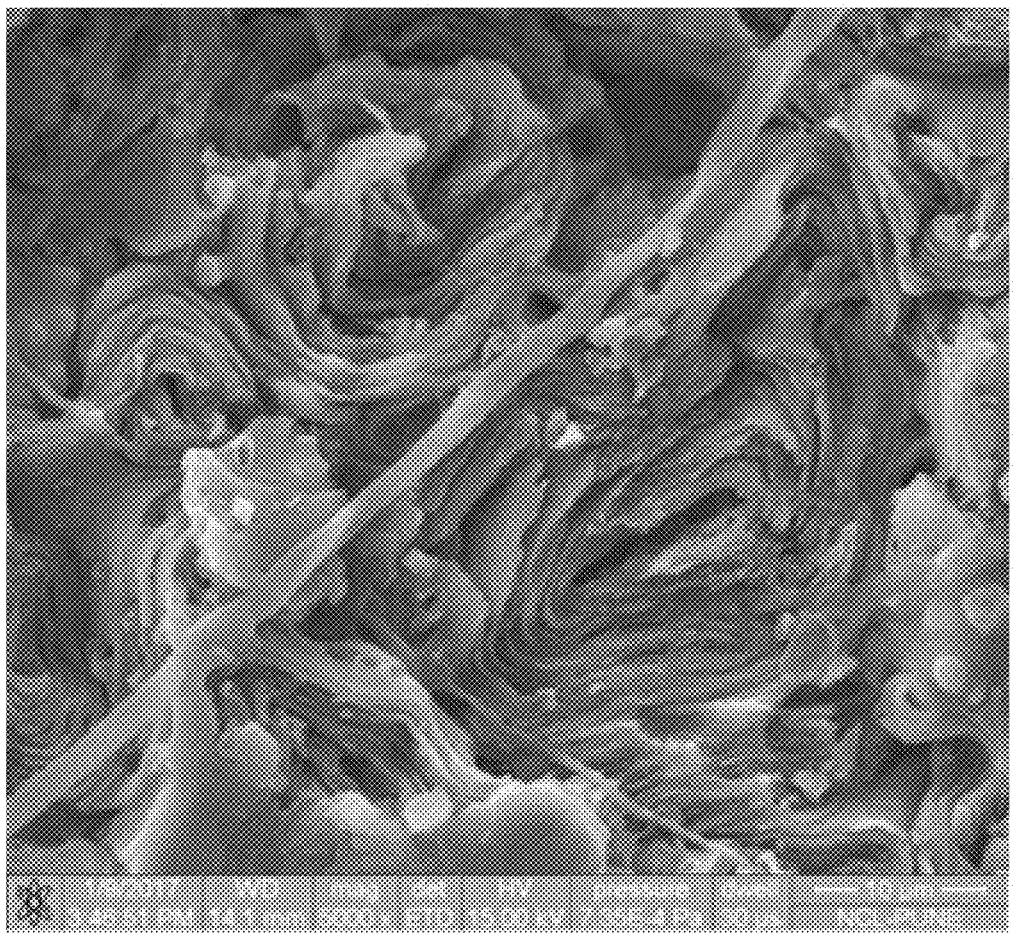
FIG. 7 shows an SEM of internal layered structure of media used in an embodiment of the invention. The SEM has the following settings: WD=14.1 mm; mag=5000×; det=ETD; HV=15.00 kV; pressure=7.35E-4 Pa; and dwell=30 µs. Scale is 10 µm.

Three dimensional internal layered structure of media gives permanent binding of the heterotrophic bacterial culture and hemicelluloses along with lignin provides external framework. Three-dimensional layered structure of media can be seen through scanning electron micrograph, as shown in FIG. 7.

The media in embodiments of the present invention can be used in an untreated or it can be treated by suitable methods. Treated media gives advantage in terms of reduction of activation time in biological process. The difference in activation time reduction is measured by keeping both media untreated and treated one in similar biological condition and at the same temperature. Oxygen free environment was created to cultivate anoxic/anaerobic culture. ORP of both the sample was measured and it was observed that in the treated media ORP value dropped much faster as compared to untreated media.

Figure 8:
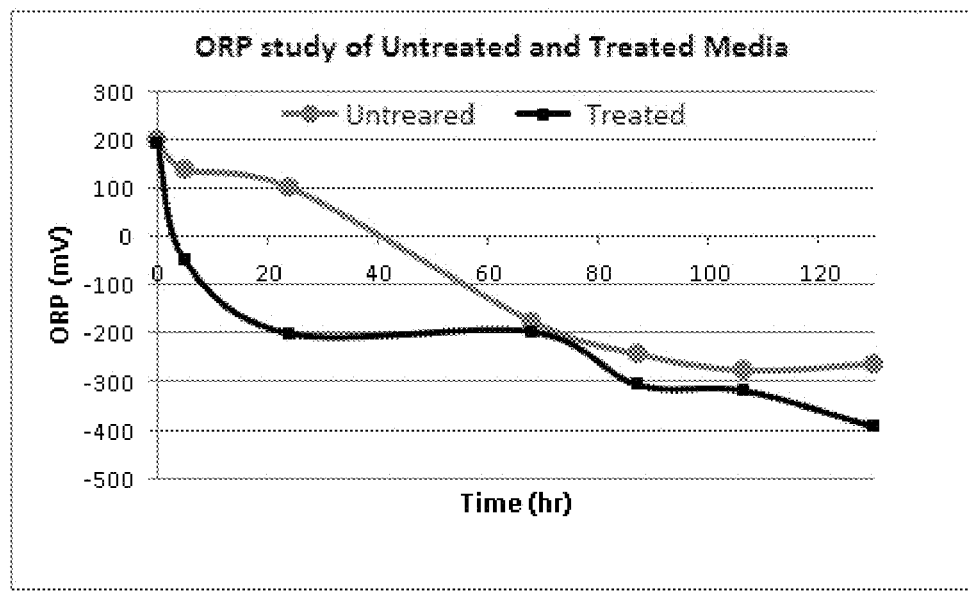
FIG. 8 shows an ORP Study of untreated and treated media.

As shown in FIG. 8, ORP of treated media reduced to −50 mV within 5 hours of time while untreated media took more than 40 hours to attain negative ORP. Treatment of media gives advantage of external layer opening to accommodate microbial culture within its structure. Media treatment mechanism is further described in details in the "Treatment of Media" section herein.

3a. Treatment of Media

The treatment is a crucial step and is performed in controlled conditions. The treatment involves alteration or distribution of outer lignin or external structure. The following are the main reasons to do the pretreatment:
   a. Increasing porosity and create void space to increase surface area;
   b. Modification of lignin or external structure; and
   c. Expose layered structure of cellulose molecule to external biological environment.

In general, treatment of media can be done by mechanical, chemical or biological methods. Mechanical pretreatment involves size reduction or ultrasonic treatment. Oxidative degradation with hydrogen peroxide, ozonolysis or wet oxidation are chemical methods that can be used. Combinations of methods may also be used. In chemical methods, treatment of media in alkaline or acidic conditions may also be applied. Biological methods can also be used for media treatment, but it takes longer time to treat media through this process. In embodiments of the present invention, multiple chemical treatments methods may be used to test the efficiency enhancement of the media. In one of the embodiments of the present invention the treatment of media is done with dilute sodium hydroxide solution. The sodium hydroxide concentrations vary from 1 to 16%, preferably from 2 to 5%. The treatment time varies from 12 hours to 50 hours, preferably from 12 hours to 24 hours. This results in enhanced media performance and significant reduction in activation time.

Figure 9:
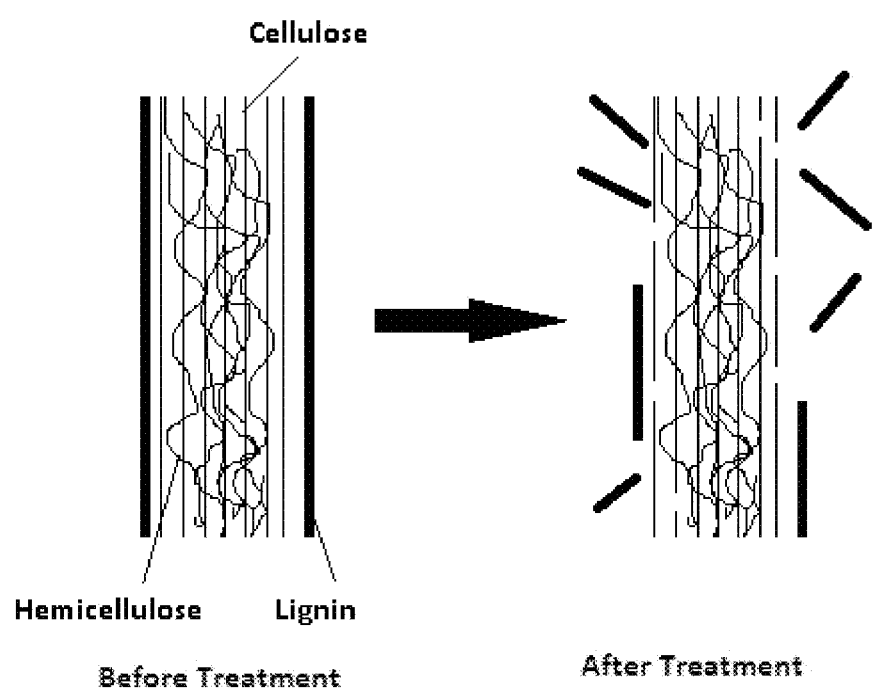
FIG. 9 shows a representation of media structure before and after treatment.
Figure 10:
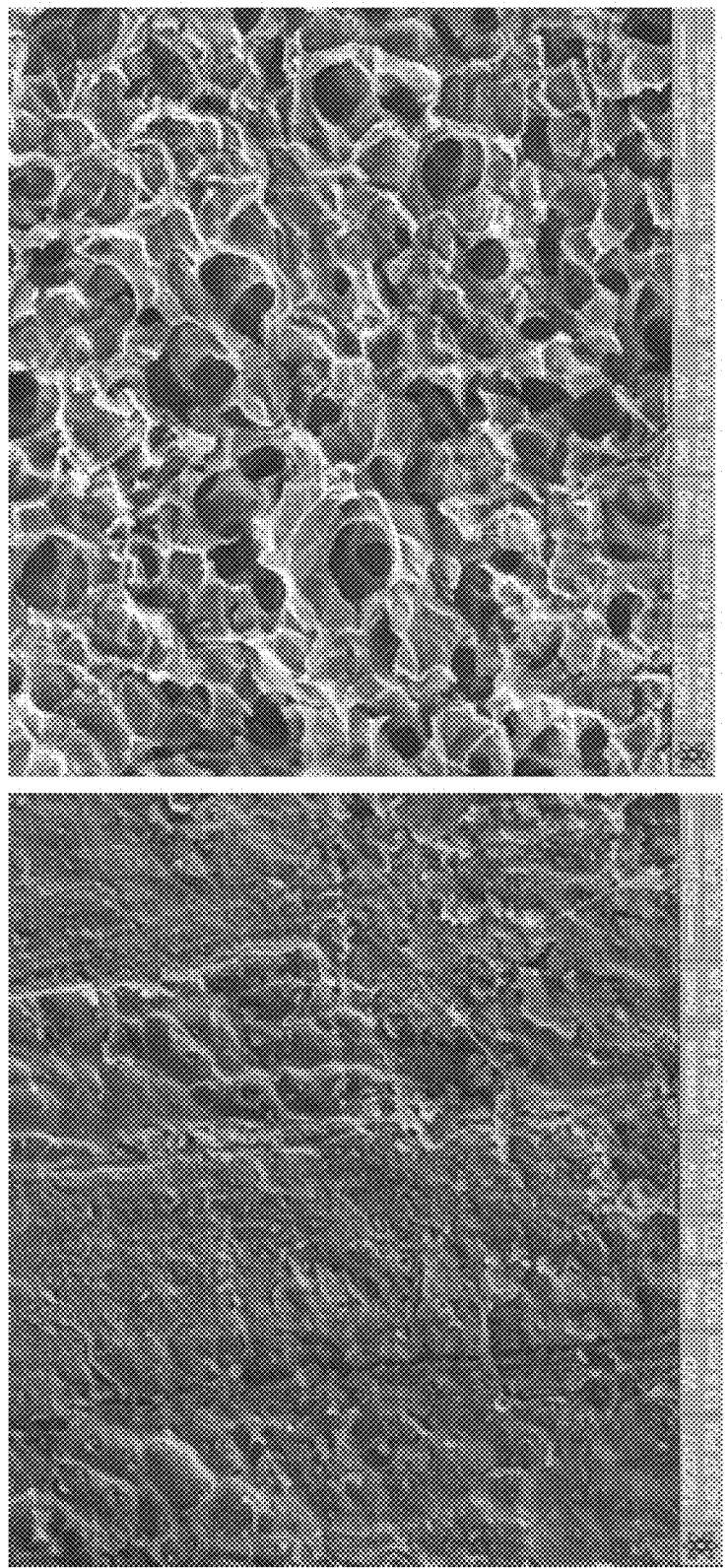
FIG. 10 shows a comparison by SEM of treated (left) and untreated (right) media. The left SEM has the following settings: WD=13.8 mm; mag=1000×; det=ETD; HV=15.00 kV; pressure=8.42E-4 Pa; and dwell=10 µs. Scale is 50 µm. The right SEM has the following settings: WD=14.0 mm; mag=1000×; det=ETD; HV=15.00 kV; pressure=8.43E-4 Pa; and dwell=10 µs. Scale is 50 µm.

Treatment of media opens up the outer rigid layer of lignin as shown in FIG. 9, and it exposes the inner layer for the bio-mass to get embedded in the void space. A scanning electron micrograph of the untreated and media after treatment clearly indicates difference in surface porosity. Deep pores penetrating up to internal structure of media have been observed, as shown in FIG. 10.

3b. Media Activation

Figure 11:
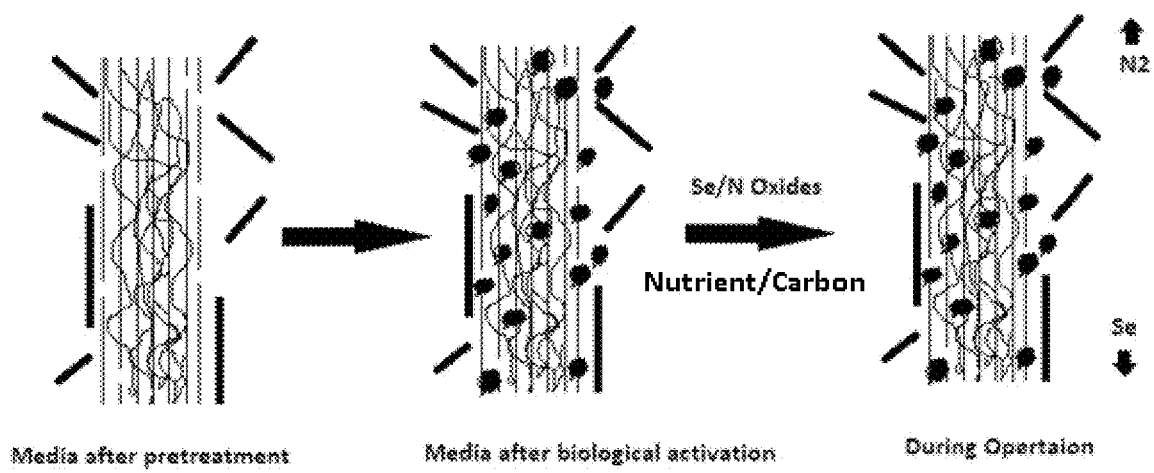
FIG. 11 shows a representation of media activation and oxide removal.
Figure 12:
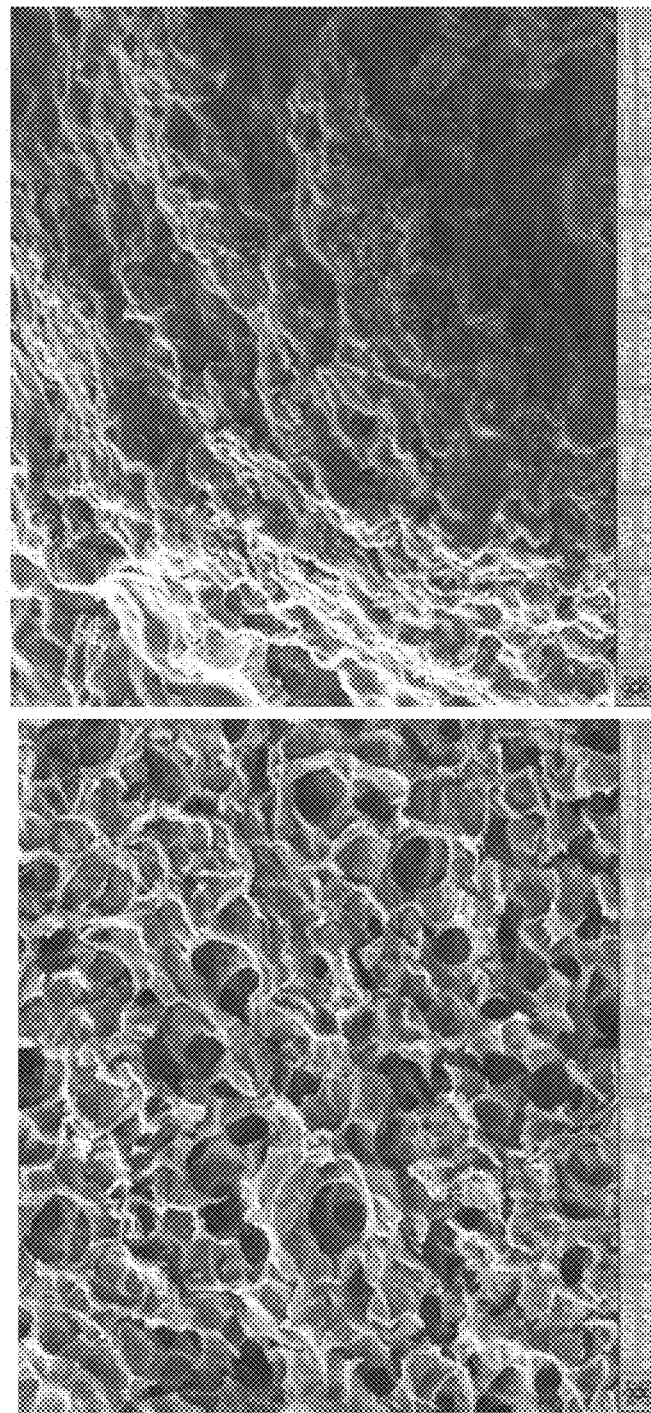
FIG. 12 shows presence of biological culture in deep pores of media, by scanning electron micrographs (SEM). Left image shows treated media, right image shows activated media. The left SEM has the following settings: WD=14.0 mm; mag=1000×; det=ETD; HV=15.00 kV; pressure=6.43E-4 Pa; and dwell=10 µs. Scale is 50 µm. The right SEM has the following settings: WD=23.4 mm; mag=1000×; det=ETD; HV=15.00 kV; pressure=1.65E-3 Pa; and dwell=10 µs. Scale is 50 µm.

Raw or treated media are activated in suitable biological conditions with the addition of microbial culture. For media activation a carbon source like glucose, yeast, mixtures of carbon sources, phosphate, and mixtures of micronutrients can be used. During activation a microbiological culture sits in a deep shallow structure of the media. As there is a framework of lignin to provide support, this microbial culture does not easily come out during physical backwashing of media. A process of media activation and operation is shown in FIG. 11. Due to this specific structure of media and the bioactivity of media once activated, bioactivity remains permanent and does not get easily de-activated during the back wash process or during upset conditions. This helps in establishing a consistent performance even immediately after the backwash process. The presence of biological culture in deep pores of media is also confirmed by scanning electron micrographs.

When oxides of selenium and nitrogen come in contact with activated media in the presence of carbon source, the oxides gets reduced. Nitrogen and selenium get separated in the form of gas and solid respectively. The media used in present invention has the capability to hold billions of bacterial culture at its surface. As shown in Table 2, microbiological testing indicates that both denitrifying and sulfate reducing bacteria are present on the media surface and its structure.

TABLE 2

Microbiological count of media

| Parameter | Unit | Media bacterial count |
| --- | --- | --- |
| Total Plate Count | CFU/g | $11 \times 10^8$ |
| Sulphate reducing bacteria | CFU/g | $25 \times 10^4$ |
| Denitrifying bacteria | CFU/g | $16 \times 10^5$ |

4. Biological Processing

Figure 13A:
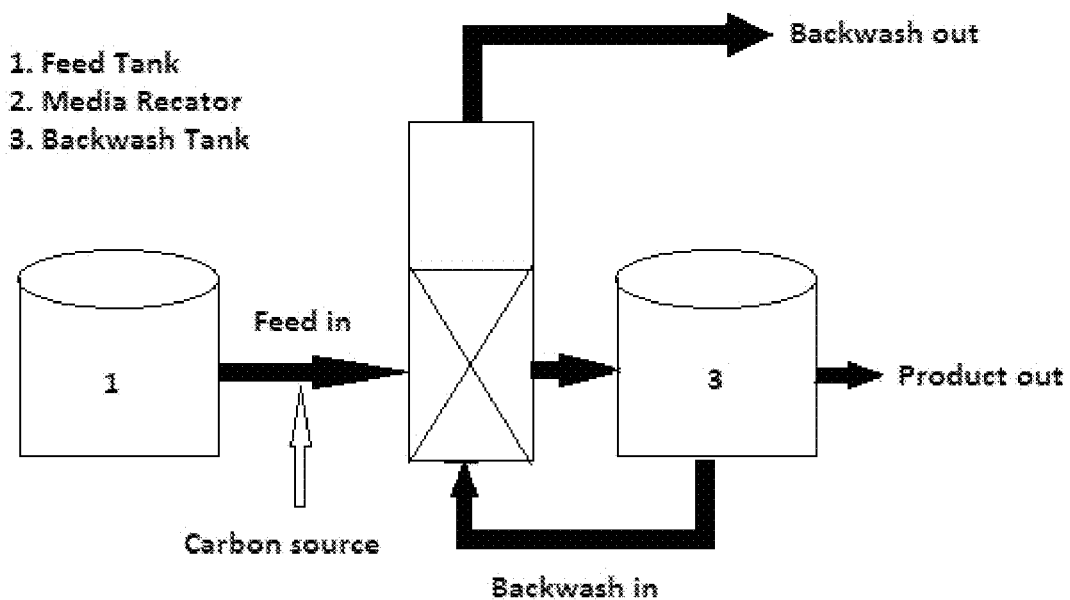
FIG. 13A shows a flow scheme of a single stage biological process of an embodiment of the invention.

Biological processing may be conducted with a single and multiple columns in series depending on the level of contamination. The media is filled in the columns up to a predetermined height. The media column can be adjusted based on a single stage or multistage process. In one of the embodiments media depth in the column height is 1 meter. Approximately 30% free board is provided at the top of column for media expansion during backwashing. The process is operated in an up flow or down flow mode and an outlet of one column enters as feed to other another column. After certain period of operation there is an increase in pressure drop, and the columns are backwashed with treated water to remove excess sludge and elemental selenium. The sludge is treated through an additional step and subsequently filtered. The solid sludge is disposed off. Typical flow scheme of single stage biological process is shown in FIG. 13A.

In a single stage process feed water from feed tank (1) enters the media bioreactor (2), wherein carbon source is added before the media bioreactor. The outlet of the bioreactor is collected in backwash tank (3). From backwash tank (3) product gets out, and treated water from the same tank is used for the backwashing of the media bioreactor.

Figure 13B:
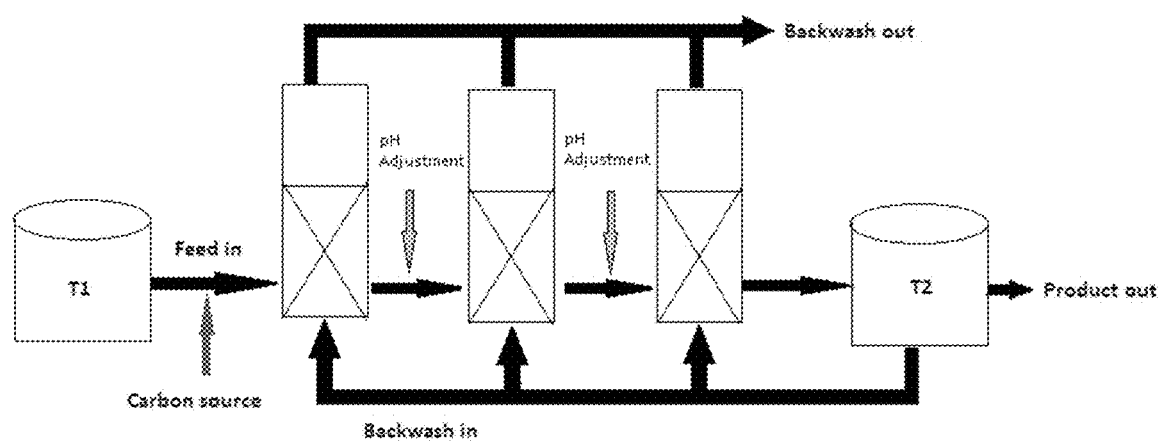
FIG. 13B shows a flow scheme of a multistage biological process.

A single or multistage biological process is used based on contamination in feed water. In one of the embodiment of the present invention, a multistage biological process was used for the study, in which three columns C1, C2 and C3 were used. (FIG. 13B.) Three columns were provided with the objective of maintaining different conditions for removal of oxyanion in the water. Each column was filled with same media height. Pressure indicator, flow meters, ORP meter and pH meter were provided for continues monitoring. Feed tank T1 was provided for storage of feed water. A carbon source was added at the inlet of C1 column pressure. The outlet of C1 goes to column C2. The pressure drop between two columns was measured by a pressure indicator. The outlet of C2 column entered C3 column, which was acting as a final polisher. Product water was collected in tank T2. Tank T2 was also acting as backwash tank for backwashing of the columns as and when there is increase in pressure drop.

The backwashing of the columns was performed to remove the gases generated and also to remove elemental selenium along with excess sludge. The backwash water entered form bottom the column and came out from top of the column. The use of column backwashing was optimized based on pressure drop. Backwash flow and time were optimized based on re-gaining of pressure drop after removal of the excess sludge along with elemental selenium and trapped gases. The excess sludge after backwashing was treated through a post treatment step and subsequently filtered and disposed of.

4a. Startup of the Biological Process

In a typical embodiment, the following steps may be followed during initial startup of the process. Media activation is an important step during initial startup.
1. All three columns were filled with media up to a desired height. For activation of media naturally occurring microorganisms were added to the columns.
2. Initially columns were operated with low velocity 0.05 m/hr velocity.
3. Simulated feed water was prepared by addition of selenium oxide to the water.
4. As process was optimized with high TDS, water TDS was maintained from 12,000 to 25,000 mg/lit.
5. Carbon source and nutrients were added to the feed entering the first column.
6. With minimum velocity operation removal efficiency of selenium was tested.
7. Once the Selenium reduction was achieved in desired range, process was operated at different velocities and tried to optimize at maximum possible velocity.
8. After achieving Selenium reduction at higher optimum velocity, another oxyanion, nitrate was added to the simulated water and further optimization was done with two oxyanion.
9. After achieving selenium and nitrate reduction at desired levels, further testing was done with simulated water having character like FGD (Fuel gas desulfurization) wastewater.

For optimization and achieving desired level of results the process was operated with different velocities. The quantity of carbon source was optimized, and pH & ORP measurements were done continuously by online (Emersion make) instrument. The selenium measurement was done by Atomic Absorption spectroscopy by an external lab. The nitrate analysis was done by spectrophotometric method. Sulfate analysis was also performed to monitor and have better control over the process.

5. Method of Post Treatment for Outlet from Biological Process

Embodiments may provide an optional method for post treatment of the outlet from the biological process. In biological processing, selenium oxides gets reduced to elemental selenium and also generates sludge from the carbon source added to the process. Solids generated in the process get trapped in media and most of the solids come during backwashing, but there is a possibility that some finely suspended particles may carry over with the treated water through this water. This may involve a sand or dual media filtration. The filtered water will filter any carry over.

Also carbon source added to the process to maintain certain range of oxidation-reduction potential, if not consumed completely would remain in soluble form and contribute to the COD and BOD. To remove fine suspended solids and soluble COD/BOD from it is necessary to treat this final effluent with suitable and economical process. In this case an aerobic process may be involved. This may be an activated sludge or Moving Bed Bio Reactor or Membrane Bio reactor process. This process will reduce the COD and also suspended solids after media or membrane filtration.

The water treated through biological process may not need any further treatment or may need a simple filtration through a sand filter or may need a biological and filtration process. Present invention may involve a filtration or aerobic biological process along with membrane filtration to resolve above-mentioned issues. Membrane bioreactor technology is described herein.

Description of Post Treatment Processing

Figure 14:
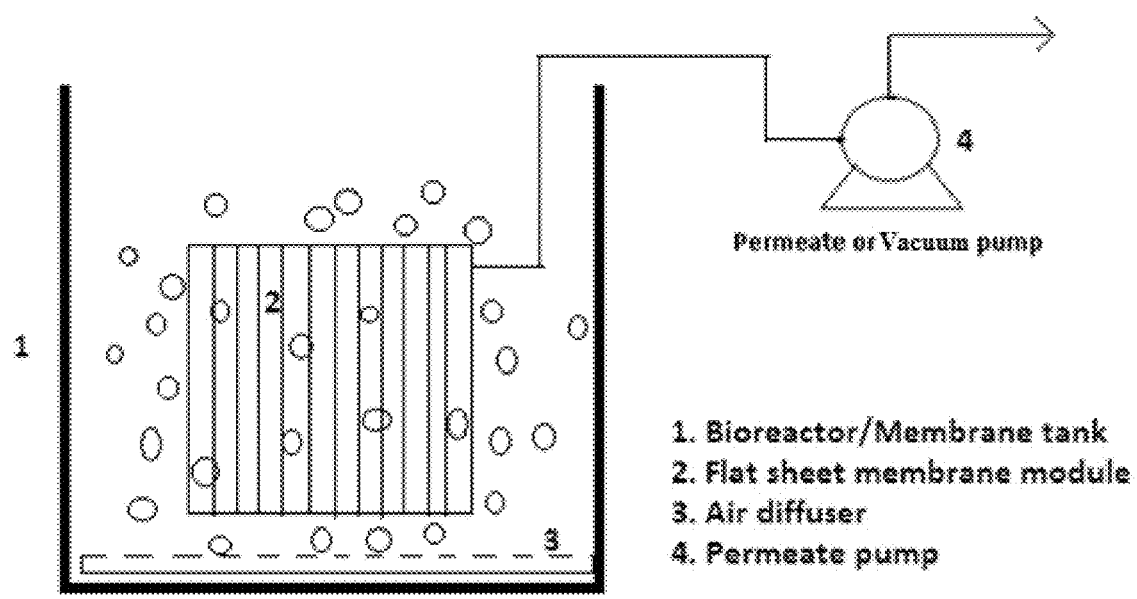
FIG. 14 shows a flow scheme of a typical post-treatment method.

In a membrane bioreactor process, in the presence of oxygen degrades soluble COD/BOD and converts it into sludge and carbon dioxide. The sludge generated will be removed by using membrane modules. A flat sheet or hollow fiber ultrafiltration membranes can be used the membrane filtration. In one embodiment the module was prepared by assembly of number of membrane plates with specific gap of 2-10 mm in between. Module made for testing was having 10 plates. Two such modules are placed one above other. Module was operated in an "out to in" mode. Product was collected by vacuum/suction pump from module. Methods of preparation of flat sheet membrane module are described in U.S. Pat. No. 8,753,509 B2, which is incorporated by reference herein. In post treatment method, outlet from the anoxic/anaerobic biological process enters the reactor, which is provided with aeration. The reactor also contains membrane modules. Membrane modules are also provided with air diffuser for scrubbing purpose. A typical flow scheme is as shown in FIG. 14. Product from post treatment process is free of suspended solid and having BOD of <30 ppm.

EXAMPLE 1

In this example, a process was studied for removal of selenium. Simulated water having selenate/selenite and high total dissolved salt was prepared. This simulated water was run though the system as shown in FIG. 13A. Initially the process was operated with low velocity, and gradually velocity of the process was increased. With variation in velocity, hydraulic retention time also changed, and the HRT of the system was reduced. The average concentration of feed selenium was 2.5 ppm. The reduction of selenium was measured throughout the trials to understand effect of change of velocity over reduction of selenium. In gradual increments, velocity was increased up to 10 m/hr from 0.05 m/hr. It was observed that the treated media used in process is very much helpful to maintain selenium reduction at high velocity also. Reduction of selenium observed to be maintained to more than 99% as shown in Table 3.

TABLE 3

Operation at different velocity.

| Trial No | Velocity m/hr | Feed Selenium Mg/lit | Product Selenium Mg/lit | Average Reduction % |
|---|---|---|---|---|
| 1 | 0.05 | 1.89 | 0.011 | 99.4 |
| 2 | 0.10 | 2.72 | 0.011 | 99.6 |
| 3 | 0.20 | 2.42 | 0.012 | 99.6 |
| 4 | 0.40 | 2.77 | 0.010 | 99.6 |
| 5 | 0.82 | 3.08 | 0.012 | 99.6 |
| 6 | 1.64 | 3.15 | 0.012 | 99.6 |
| 7 | 3.06 | 2.97 | 0.012 | 99.6 |
| 8 | 5.20 | 2.63 | 0.012 | 99.3 |
| 9 | 7.50 | 2.05 | 0.012 | 99.3 |
| 10 | 10.0 | 2.11 | 0.014 | 99.2 |

Figure 15:
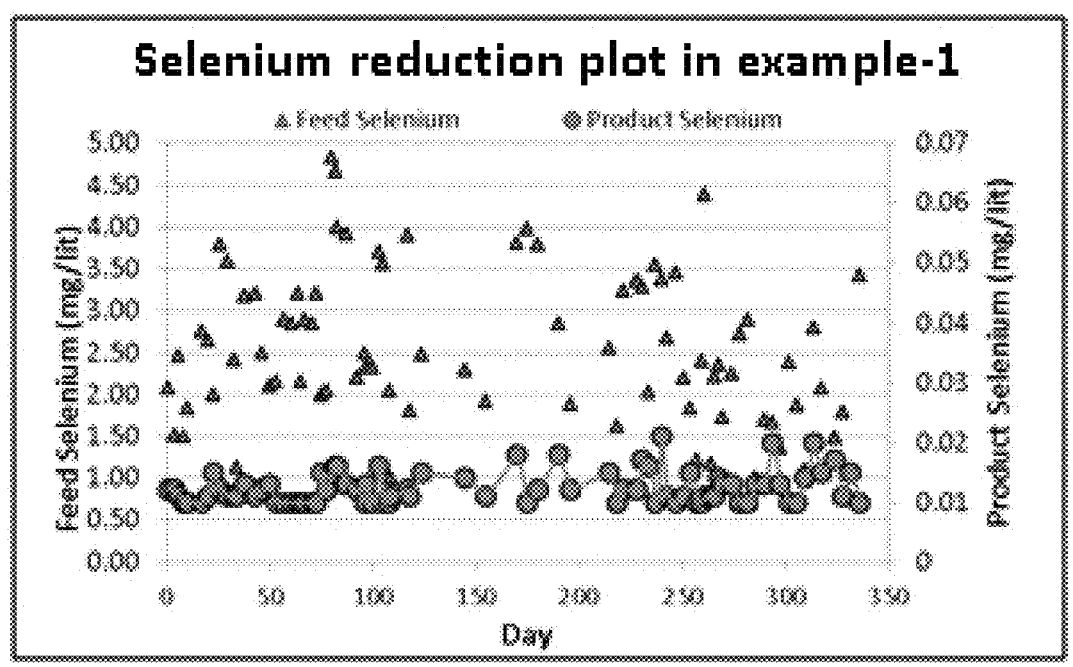
FIG. 15 shows a selenium reduction plot related to Example 1.

With average feed selenium 2.57 mg/L, product shows average selenium 0.011 mg/lit. Plot of selenium reduction with is shown in FIG. 15.

Figure 16:
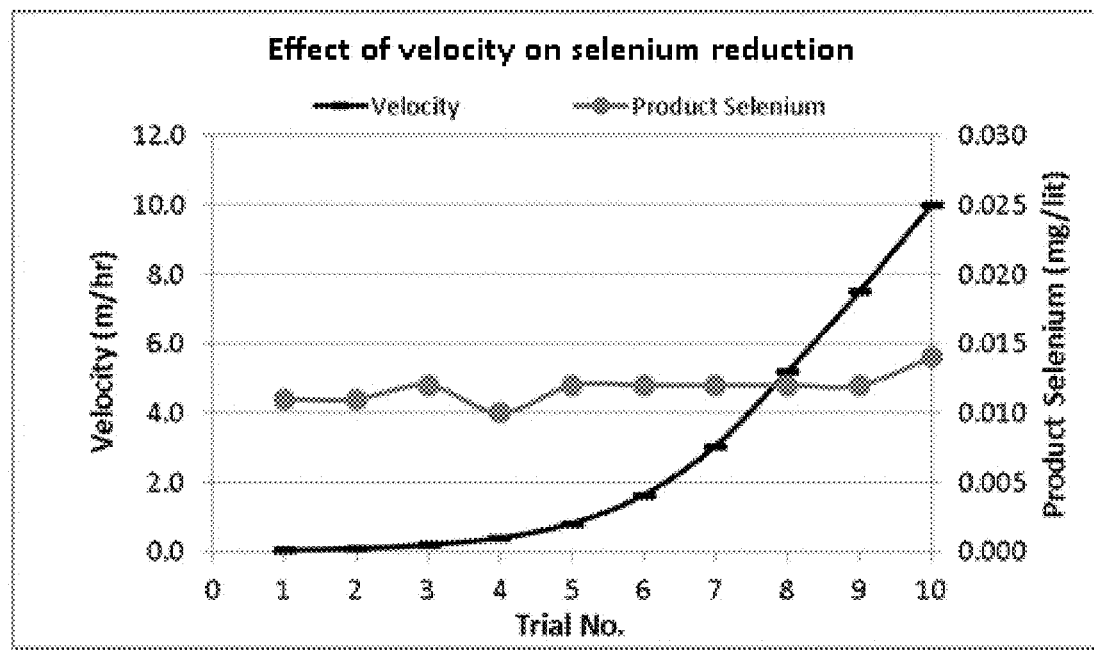
FIG. 16 shows a plot of effect of velocity on selenium reduction.

With increase of velocity and decrease of hydraulic retention time, the reduction of selenium was maintained. This indicates performance of media in terms of providing a larger surface for bio-film formation and subsequently providing an environment for biological activity and its maintenance and growth. As shown in FIG. 16, velocity of the process was increased from 0.05 to 10 m/hr and all at the time process had shown stable performance in terms of selenium reduction. Average selenium in product was observed to be 0.011 mg/L.

Figure 17:
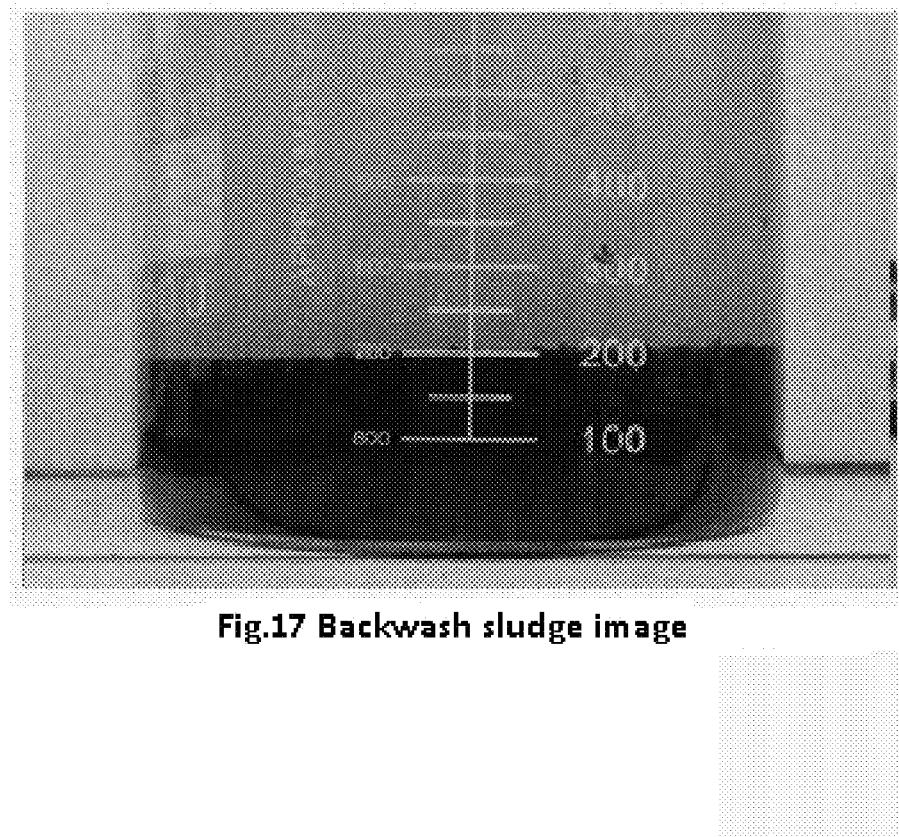
FIG. 17 shows an image of backwash sludge.
Figure 18:
FIG. 18 shows an image of dried backwash sludge.

After the increase of pressure drop though the columns by 30 to 50%, the columns were backwashed to remove excess sludge generated during the process, as well as elemental selenium. Backwash velocity ranged from 40 to 120 m/hr. Backwash sludge collected was reddish, which indicated the presence of elemental selenium. Blackish color sludge indicates presence of anaerobic conditions within the column. See FIG. 17. The sludge formed in biological processing was fast settling and easily filtered through filter press. Image of dried sludge is shown in FIG. 18.

Figure 19:
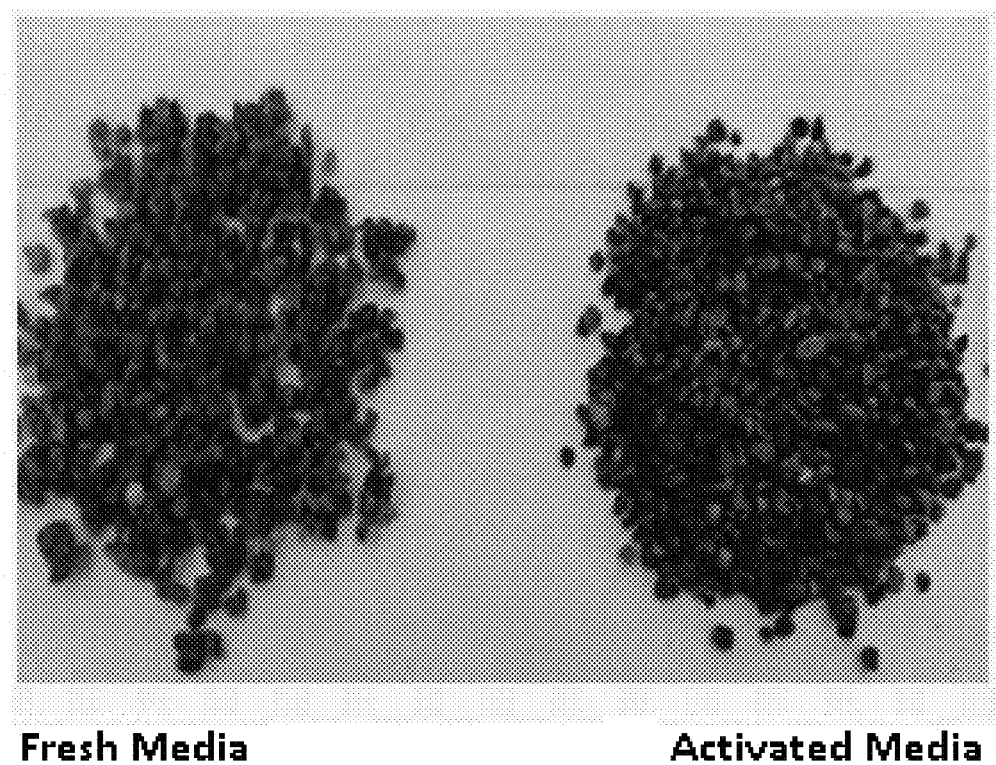
FIG. 19 shows a comparison of fresh media (left) and activated media (right).

After the full activation of the media turned black, and formation of biofilm was seen over the porous surface. The benefit of using this media is that even after backwashing, the biofilm remains intact on the media as it gets penetrated in the layered structure of it as shown in SEM image. A sample of the media was thoroughly washed with water to remove any sludge on the surface but the media color remained black indicating that the penetration of bioactivity inside the porosity of the media. Throughout the process consistent reduction of selenium was observed, even if some suspended biomass got lost during backwashing of column. Due to the penetration of biomass inside the media activity was retained at high level of effectiveness. This is because billions of microorganisms resided within the media structure. The color difference between fresh and activated media is shown in FIG. 19.

EXAMPLE 2

Figure 20:
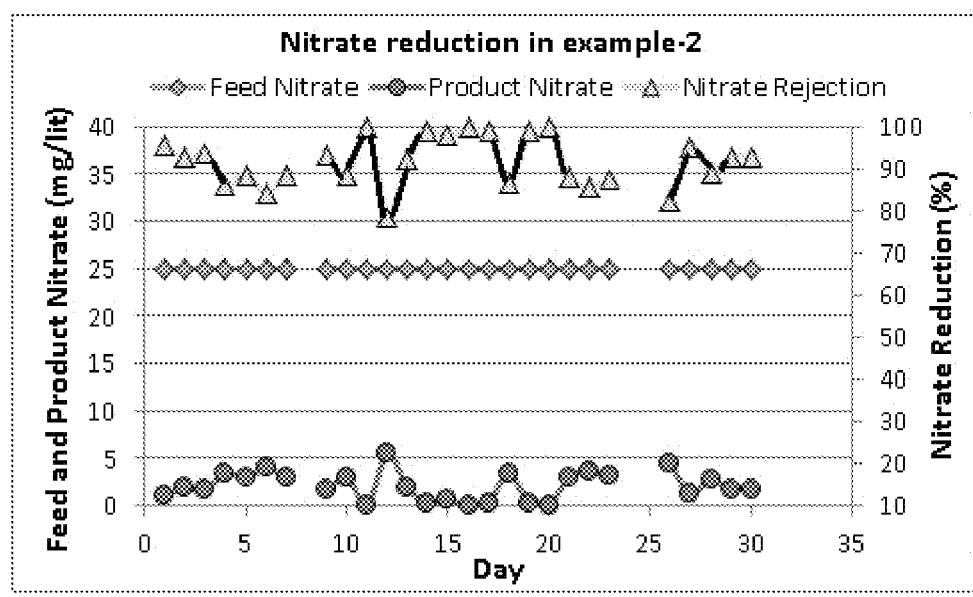
FIG. 20 shows a plot of nitrate reduction in Example 2.

After getting consistent reduction of selenium from the system another oxyanion, nitrate was introduced to the system. Base on the ORP values, removal of nitrogen happens at higher ORP, while selenium gets removed at lower ORP but with this media and buildup of bio mass structure, simultaneous reduction was observed for both selenium and nitrate. The system was operated at 7.5 and 5 m/hr velocity. The simulated water with high total dissolved salt with selenite, selenite and nitrate as oxyanion was used as feed to the biological system. It was observed that product $NO_3$—N was maintained at an average of 2.0 ppm. FIG. 20 shows the plot of nitrate reduction during the process.

With 25 ppm feed $NO_3$—N average nitrate reduction was observed to be >90%. Nitrate reduction was maintained at 7.5 m/hr velocity. This indicates that with the process of present invention it is possible to achieve high reduction of both nitrogen and selenium oxides at low HRT simultaneously.

EXAMPLE 3

In Example 3 trials were conducted with water having character like FGD wastewater. Table 4 shows character of FGD wastewater:

TABLE 4

Simulated wastewater character

| Parameter | Unit | Value |
|---|---|---|
| pH | | 7.6 |
| Conductivity | µSi | 29000 |
| Total dissolved salt | mg/L | 15000 |
| Anion | | |
| Fluoride | mg/L | 9.7 |
| Chloride | mg/L | 8233 |
| Nitrite | mg/L | 9.8 |
| Bromide | mg/L | 54.6 |
| Nitrate | mg/L | 17.8 |
| Sulfate | mg/L | 1081 |
| Phosphate | mg/L | 0.25 |
| Cation | | |
| Lithium | mg/L | 0.25 |
| Sodium | mg/L | 45 |
| Ammonium | mg/L | 3 |
| Potassium | mg/L | 22.5 |
| Magnesium | mg/L | 679 |
| Calcium | mg/L | 4215 |
| Beryllium | mg/L | 2.5 |
| Boron | mg/L | 189 |
| Aluminum | mg/L | 1.1 |
| Silica | mg/L | 20.5 |
| Titanium | mg/L | 0.057 |
| Vanadium | mg/L | 0.05 |
| Chromium | mg/L | 0.033 |
| Manganese | mg/L | 1.92 |
| Iron | mg/L | 1.73 |
| Cobalt | mg/L | 0.010 |
| Nickel | mg/L | 0.23 |
| Copper | mg/L | 0.085 |
| Zinc | mg/L | 1.65 |
| Arsenic | mg/L | 0.94 |
| Selenium | mg/L | 2.54 |
| Strontium | mg/L | 14.30 |
| Molybdenum | mg/L | 0.033 |
| Silver | mg/L | 0.0048 |
| Cadmium | mg/L | 0.11 |
| Antimony | mg/L | 0.038 |
| Barium | mg/L | 0.57 |
| Tungsten | mg/L | 0.0052 |
| Lead | mg/L | 0.0043 |

To develop the process we started with oxyanion like selenate/selenite and nitrate only. Because the next goal was treatment of waste water like FGD waste water, the FGD wastewater was simulated with other constituents including calcium, magnesium and sulfate. The objective was to understand the impact of addition of contaminants other than selenium and nitrate and also how each column would participate in the process; it was decided to study the kinetics of the process and its relationship with carbon source quantity and mode of addition. The study was done at fixed velocity and trend of nitrate and selenium removal was observed. The system was operated with multistage columns as shown in FIG. 13B. In the first column ORP was maintained to initiate the process. It was observed that reaction initiation plays a key role in the removal of oxyanion in the process. As concentration of selenium was less as compared to sulfate and nitrate, removal of selenium was observed to be more challenging.

In first column ORP range of anoxic condition was maintained. +50 to −150 mV and average ORP was −50 mV, which was maintained by addition of optimized carbon quantity or combination of altering the carbon source and operational velocity. With this range of ORP there was initiation of the process and first column started to show the reduction of both selenium and nitrate. The carbon source added to first column helped in process of initiation of the media. The unreacted excess carbon from the first column entered the subsequent columns. The water coming in contact with highly activated biological media, the ORP drops down further. With optimized carbon source concentration, average selenium reduction in first column was observed to be 80%. The Nitrate reduction observed to be 34.4% in the first column. Data of the first column result are tabulated in Table 5.

TABLE 5

Results of selenium and nitrate reduction in first column

| ORP | Selenium | | | Nitrate | | |
|---|---|---|---|---|---|---|
| Range mV | Feed Mg/lit | Product Mg/lit | Reduction % | Feed Mg/lit | Product Mg/lit | Reduction % |
| 0 to −50 | 2.42 | 0.47 | 80.05 | 9.96 | 6.53 | 34.4 |

In second column ORP was maintained lower than −150 mv, more specifically in between −250 to −350 mv. When outlet of first column entered to second column, it entered with some concentration of oxy-anion and any residual carbon source. Sufficient carbon source was available to take the reaction further to next level. It was observed that selenium reduction in second column was 96% while nitrate reduction 85% as shown in Table 6. Reduction of oxyanion started to take place in second column also.

TABLE 6

Results of selenium and nitrate reduction in second column

| ORP | Selenium | | | Nitrate | | |
|---|---|---|---|---|---|---|
| Range mV | Feed Mg/lit | Product Mg/lit | Reduction % | Feed Mg/lit | Product Mg/lit | Reduction % |
| <−300 | 2.42 | 0.086 | 96 | 9.96 | 1.41 | 85 |

In the next step in sequence the second column product entered to third one. Here also ORP was maintained at lower than −250 mV and more specifically between −300 to −400 mV. This column worked as final polishing step for further reduction of selenium and nitrate for any carry over. Results of sulfate analysis showed that there was a reduction of sulfate also at this stage. Average selenium in product was observed to be 0.011 mg/lit. This column worked effectively with optimum carbon source dosing and ORP in the right range. The outlet of third column an overall 99.5% selenium reduction was observed and nitrate reduction increased to 93.44% as shown in Table 7.

TABLE 7

Results of selenium and nitrate reduction

| ORP | Selenium | | | Nitrate | | |
|---|---|---|---|---|---|---|
| Range mV | Feed Mg/lit | Product Mg/lit | Reduction % | Feed Mg/lit | Product Mg/lit | Reduction % |
| <−300 | 2.42 | 0.011 | 99.52 | 9.96 | 0.65 | 93.44 |

Figure 21:
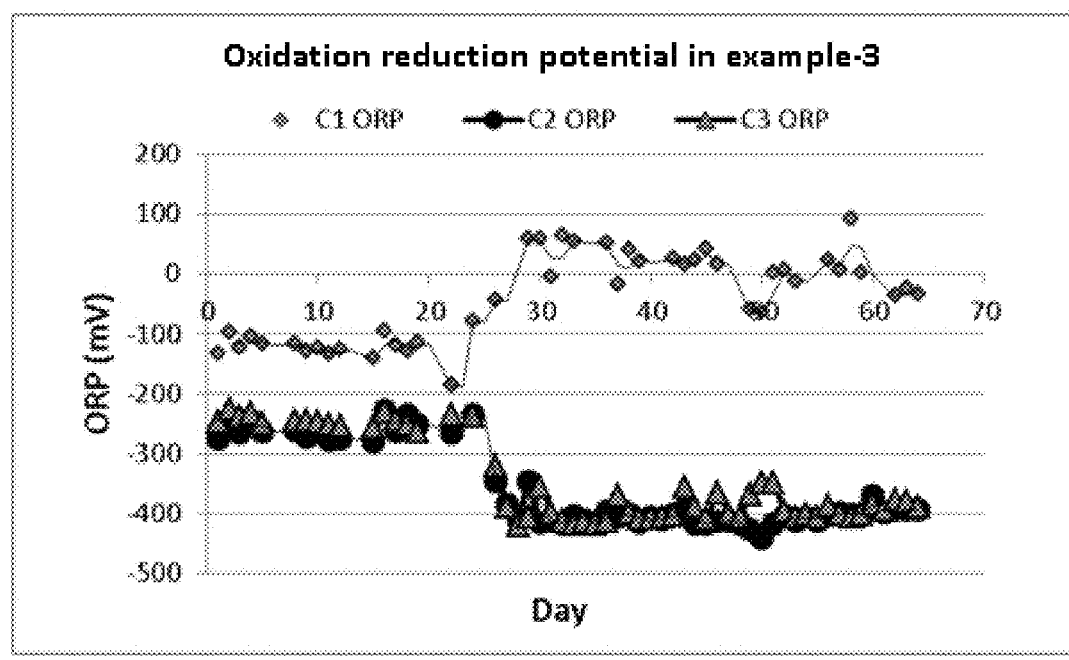
FIG. 21 shows a plot of oxidation reduction potential in Example 3.

ORP trend for all three columns is shown in graphical format in FIG. 21.

Overall results show that simultaneous reduction of selenium and nitrate is happening through all three columns. In first column percentage of selenium reduction is more compared to nitrate reduction. In this area biological media is playing an important role.

The media is not only adsorbing the heavy metal but also is able to create and hold heterotrophic biomass in the porous structure in the presence of carbon source being added. As both selenium and microorganism are present at the surface, reaction kinetics become high and reduction of selenium is possible at low HRT. Once oxides of selenium get reduced; it converts into solid selenium element and leaves its place. Media is regenerated in-situ and ready to take another oxide to selenium.

Figure 22:
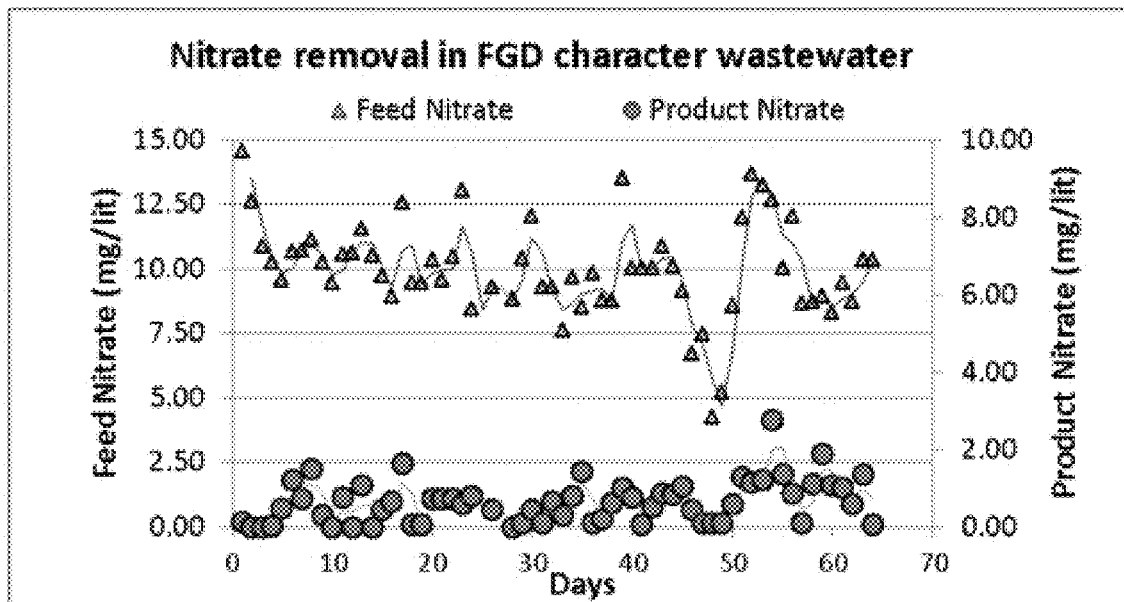
FIG. 22 shows a plot of nitrate removal in FGD-character wastewater.
Figure 23:
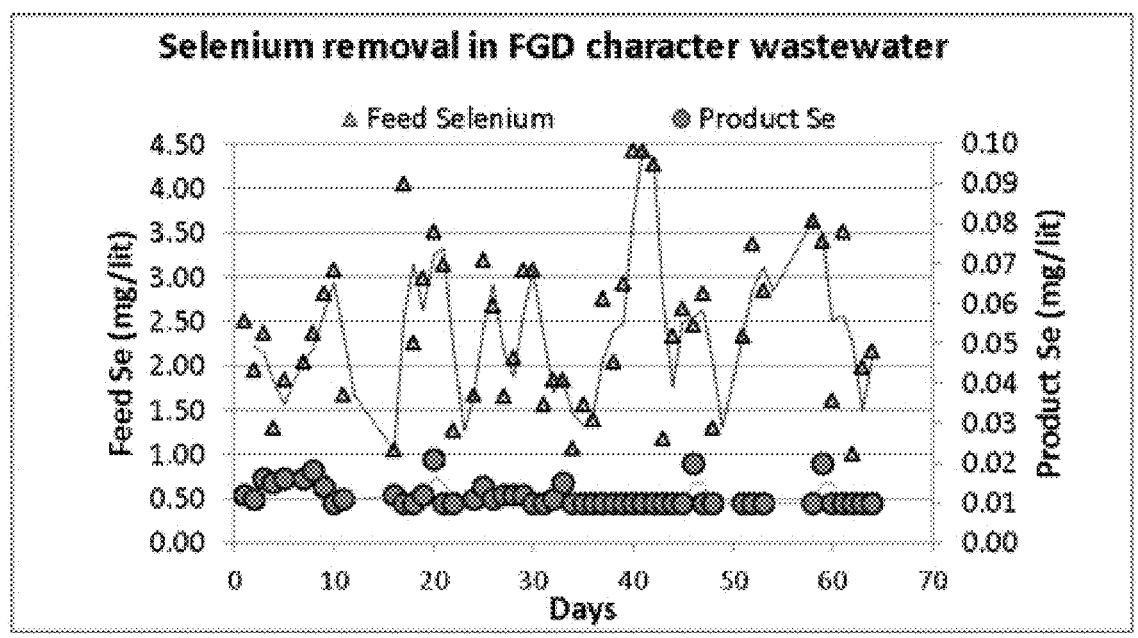
FIG. 23 shows a plot of selenium removal in FGD-character wastewater.

With FGD wastewater, selenium and nitrate reduction can be achieved to desired level of discharge limit. Embodiments of the present invention also provide a method to reduce oxyanions at lower concentration with low HRT. The level of selenium and nitrate in product water after passing through all three columns is shown in FIG. 22 and FIG. 23.

Figure 24:
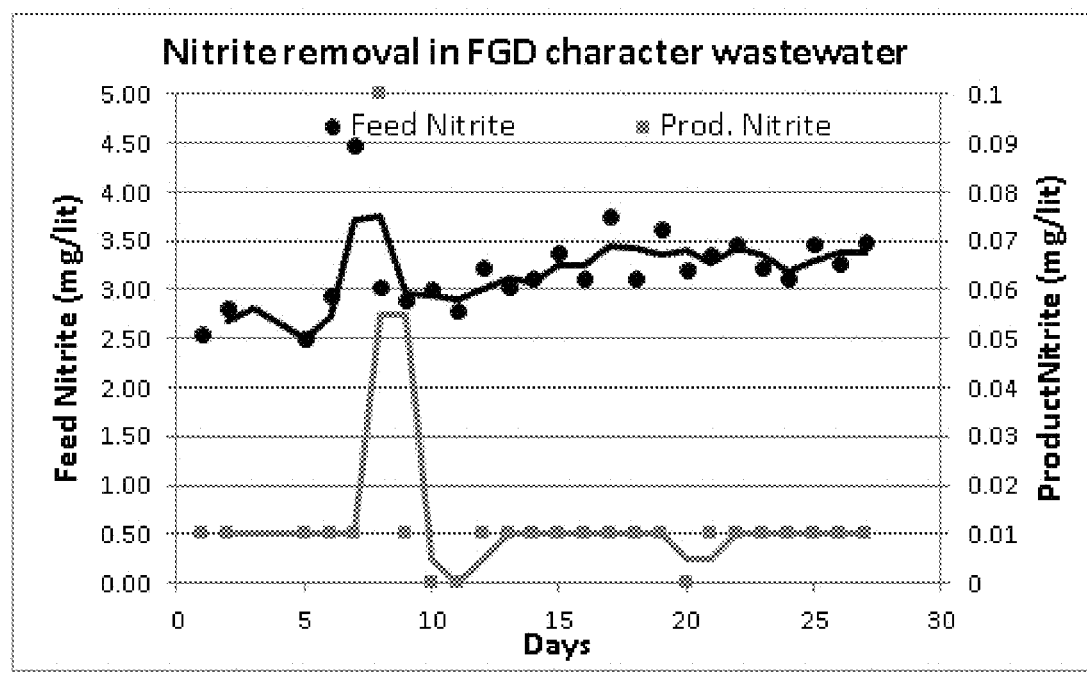
FIG. 24 shows nitrite removal in FGD-character wastewater.

Feed water also contains some amount of nitrite. Consistent nitrite reduction has been observed in the process as shown in FIG. 24. Product from this process shows 0.01 ppm nitrite.

Figure 25:
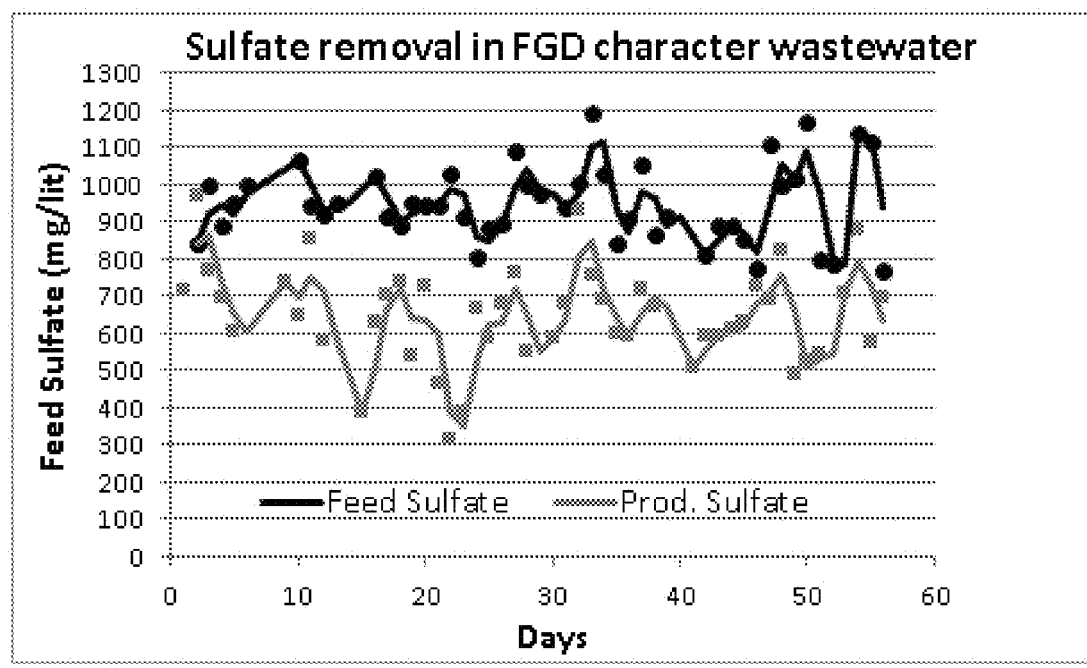
FIG. 25 shows a plot of sulfate removal in FGD-character wastewater.

As the ORP of C2 and C3 columns are in anaerobic range, sulfate reduction also observed from the system. C1 column showed 0 to 5% reduction in sulfate, after C2 column an overall 15 to 20% sulfate reduction was observed. While after C3 column an overall 25 to 30% sulfate reduction was observed. FIG. 25 shows a plot of overall sulfate reduction in product water.

EXAMPLE 4

While the previous experiments assumed lower feed water ORP in the feed water, it was observed that any increase in feed water ORP disturbs the stability of biological process and its performance of treatment of contaminants and it was necessary to feed a constant ORP water to the biological system. This study was conducted with FGD blow down as feed water with higher ORP water.

In Example 4, high ORP wastewater was used as feed to the biological system. The character of wastewater is shown in Table 8. Wastewater was treated with an ECT process to a stable range of ORP and also reduce heavy metal contamination as much as possible. The feed water may contain oxygen radical generating compounds and this impacts the biological process. These highly oxygenated compounds increase the ORP of feed water, which affects the biological process performance. When feed water having high ORP value was run though the biological process, ORP in the columns were disturbed and not maintained in the desirable range. And it also affected both selenium and nitrate reduction. Results with high ORP wastewater as feed is tabulated in Table 9.

TABLE 8

Wastewater composition used in experiments:

| Ions | Value, mg/L |
|---|---|
| Selenite as Se, mg/L | 1.0 |
| Selenate as Se, mg/L | 1.5 |
| Total Hardness as CaCO3, mg/L | 12660 |
| Calcium hardness as CaCO3, mg/L | 10200 |
| Magnesium hardness as CaCO3, mg/L | 2460 |
| Nitrate as N, mg/L | 7.5 |
| Nitrite as N, mg/L | 2.84 |
| Sulphate as SO4, mg/L | 1000 |
| Persulphate, mg/L | 25-50 |
| Total Alkalinity as CaCO3, mg/L | 240 |
| Total Dissolved Solids, mg/L | 16000 |
| ORP value, mV | +150 to +250 |
| pH | 6.8-7.0 |

TABLE 9

Results of high ORP wastewater operation

| ORP (mV) | | | | Selenium (mg/lit) | | | | Nitrate (mg/lit) | | | | Nitrite (mg/lit) | | | | Sulfate (mg/lit) | | | |
|---|---|---|---|---|---|---|---|---|---|---|---|---|---|---|---|---|---|---|---|
| Feed | C1 | C2 | C3 | Feed | C1 | C2 | C3 | Feed | C1 | C2 | C3 | Feed | C1 | C2 | C3 | Feed | C1 | C2 | C3 |
| 201 | 123 | −89 | −301 | 2.3 | 1.07 | 0.89 | 0.6 | 9.95 | 8.82 | 3.88 | 1.6 | 3.06 | 8.16 | 4.86 | 0.95 | 988 | 946 | 853 | 760 |

Due to increase in ORP of first and second column, reduction of selenium got affected. To stabilize ORP of feed, it was treated with the ECT process. The data is summarized below. ECT module operation condition is shown in Table 10.

TABLE 10

ECT Module Operating Conditions:

| | |
|---|---|
| Electrodes area used for experiments | 0.7 m² |
| Electrode Configuration | Monopolar |
| Current Density used for experiments | 10-20 A/m² |
| Flow rate through EC module | 50 Lph |
| Hydraulic Retention time in EC module | 12 minutes |

Figure 26:
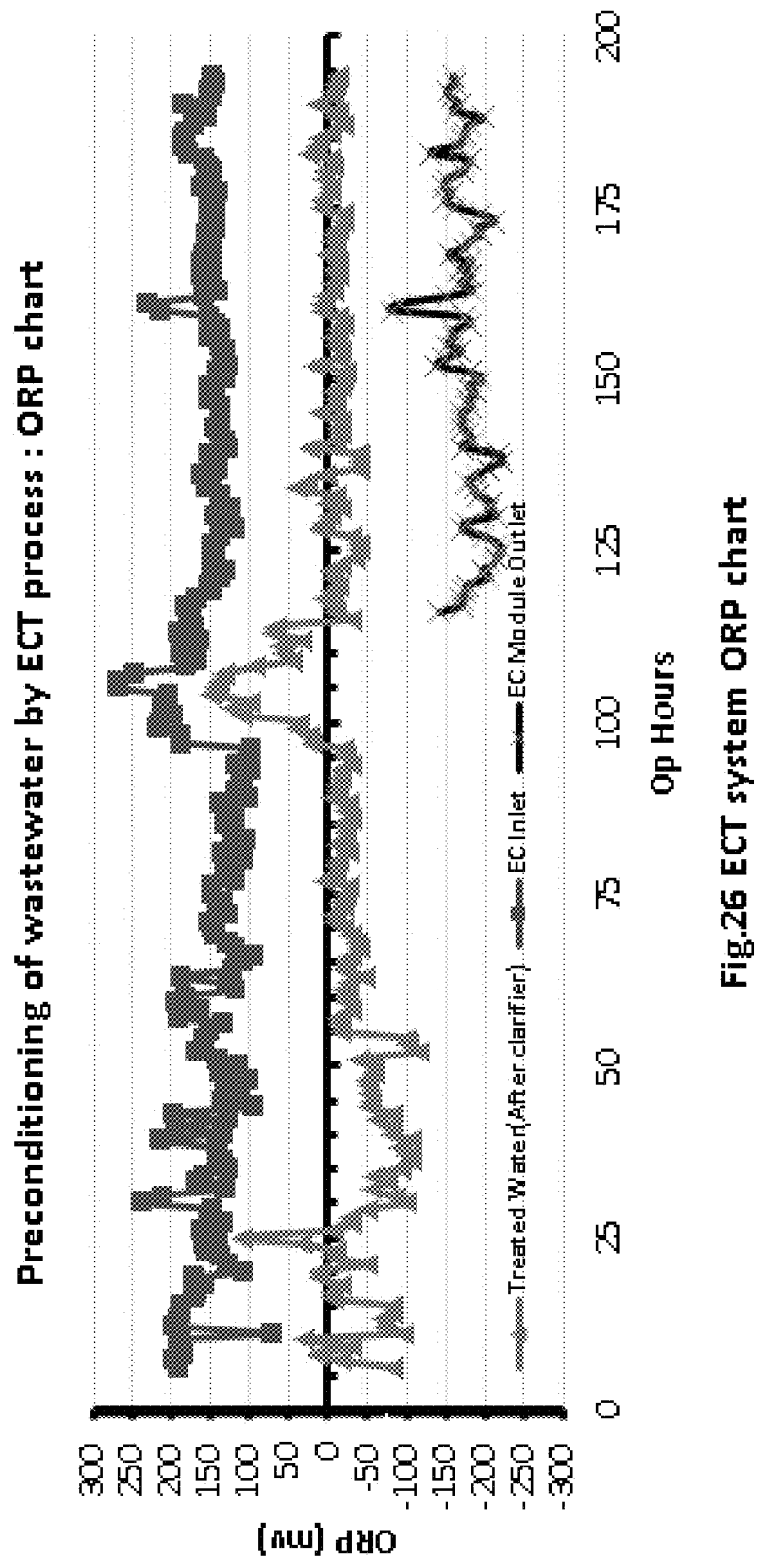
FIG. 26 is a chart of an ECT system ORP.

It was observed that for wastewater having ORP values in the range of +150 mV to +250 mV, when treated through ECT system the ORP values decreased to zero and below (negative range). It is also observed that ECT process helped in reduction of selenium load up to 85%, hardness and nitrates load up to 10% for the downstream biological process. The treated water through ECT was further clarified to remove precipitated selenium and heavy metals. ECT system was operated nearly for 200 hours for the pretreatment of wastewater and its inlet and outlet water ORP is summarized in below chart in FIG. 26 and summarized with operating data in Table 11.

TABLE 11

ECT process operating Data:

| | Feed | | | Current | pH | | ECT Module ORP | | Treated water |
|---|---|---|---|---|---|---|---|---|---|
| Op Hr | Flow LPH | Voltage V | Current Am | Density A/m² | Inlet | Outlet | Inlet mV | Outlet mV | (After filtration) mV |
| 1 | 46 | 5.5 | 11 | 16.0 | 7.3 | 6.1 | | | |
| 10 | 45 | 5.8 | 11 | 16.0 | 7.15 | 7 | 189 | | −32 |
| 15 | 45 | 6.1 | 11 | 16.0 | 7 | 6.5 | 189 | | −80 |
| 20 | 51 | 6.3 | 11 | 16.0 | 7.1 | 6.4 | 111 | | 10 |
| 26 | 50 | 7.0 | 11 | 16.0 | 7.2 | 5.9 | 163 | | −6 |
| 30 | 52 | 9.3 | 10 | 14.6 | 7.2 | 6.2 | 240 | | −99 |
| 35 | 49 | 11.3 | 10 | 14.6 | 7.1 | 6.3 | 130 | | −91 |
| 40 | 51 | 13.7 | 10 | 14.6 | 7.1 | 6.1 | 136 | | −83 |
| 45 | 51 | 14.2 | 10 | 14.6 | 7.2 | 6.4 | 138 | | −56 |
| 50 | 50 | 16.4 | 10 | 14.6 | 7.0 | 6.6 | 116 | | −60 |
| 55 | 50 | 6.3 | 9 | 13.1 | 6.4 | 6.2 | 155 | | −16 |

TABLE 11-continued

ECT process operating Data:

| | Feed | | Current | | pH | | ORP | | Treated water |
| | | | | | | | ECT Module | | |
| Op Hr | Flow LPH | Voltage V | Current Am | Density A/m² | Inlet | EC Outlet | Inlet mV | Outlet mV | (After filtration) mV |
|---|---|---|---|---|---|---|---|---|---|
| 60 | 51 | 7.6 | 9 | 13.1 | 6.7 | 6.6 | 182 | | −23 |
| 65 | 50 | 9.7 | 8 | 11.7 | 6.9 | 6.6 | 112 | | −22 |
| 70 | 49 | 9.4 | 8 | 11.7 | 6.7 | 6.8 | 149 | | −19 |
| 75 | 50 | 10.8 | 8 | 11.7 | 6.9 | 6.8 | 151 | | −23 |
| 80 | 54 | 11.5 | 8 | 11.7 | 7.0 | 6.4 | 112 | | −13 |
| 85 | 49 | 11.6 | 8 | 11.7 | 6.8 | 6.9 | 135 | | −18 |
| 90 | 52 | 16.4 | 8 | 11.7 | 6.7 | 7.1 | 121 | | −12 |
| 95 | 48 | 16.0 | 8 | 11.7 | 7.0 | 6.9 | 104 | | −23 |
| 100 | 53 | 10.5 | 9 | 13.1 | 7.1 | 6.7 | 215 | | 38 |
| 105 | 47 | 6.9 | 12 | 17.5 | 7.1 | 6.8 | 268 | | 143 |
| 110 | 48 | 8 | 12 | 17.5 | 7.1 | 5.0 | 189 | | 58 |
| 115 | 46 | 11.5 | 15 | 21.9 | 6.9 | 7.2 | 181 | | −30 |
| 120 | 46 | 15.6 | 15 | 21.9 | 6.8 | 7.1 | 152 | −179 | −11 |
| 125 | 48 | 19.5 | 15 | 21.9 | 7.1 | 7.3 | 147 | −220 | −40 |
| 130 | 50 | 17.6 | 15 | 21.9 | 7.0 | 7.3 | 147 | −214 | −2 |
| 135 | 51 | 23.4 | 15 | 21.9 | 7.0 | 7.0 | 149 | −179 | 29 |
| 140 | 49 | 14.3 | 15 | 21.9 | 7.2 | 6.8 | 129 | −171 | 26 |
| 145 | 49 | 22.7 | 15 | 21.9 | 7.0 | 6.8 | 141 | −171 | 12 |
| 150 | 50 | 23.6 | 15 | 21.9 | 7.0 | 6.7 | 133 | −195 | −19 |
| 155 | 50 | 19 | 15 | 21.9 | 7.1 | 6.9 | 141 | −152 | −9 |
| 160 | 50 | 14.6 | 15 | 21.9 | 6.8 | 7.0 | 215 | −8 | 47 |
| 165 | 50 | 20.3 | 15 | 21.9 | 7.0 | 7.1 | 164 | −182 | −13 |
| 170 | 50 | 7.9 | 15 | 21.9 | 6.9 | 7.1 | 149 | −180 | −6 |
| 175 | 49 | 6.6 | 12 | 17.5 | 7.0 | 7.1 | 147 | −162 | 9 |
| 180 | 49 | 9.1 | 15 | 21.9 | 7.0 | 7.2 | 149 | −171 | 6 |
| 185 | 50 | 9.3 | 15 | 21.9 | 7.0 | 6.1 | 186 | −170 | 10 |
| 190 | 50 | 10.9 | 15 | 21.9 | 6.9 | 7.1 | 188 | −167 | 13 |
| 195 | 49 | 13.7 | 15 | 21.9 | 7.1 | 7.2 | 150 | −160 | −11 |

Figure 27:
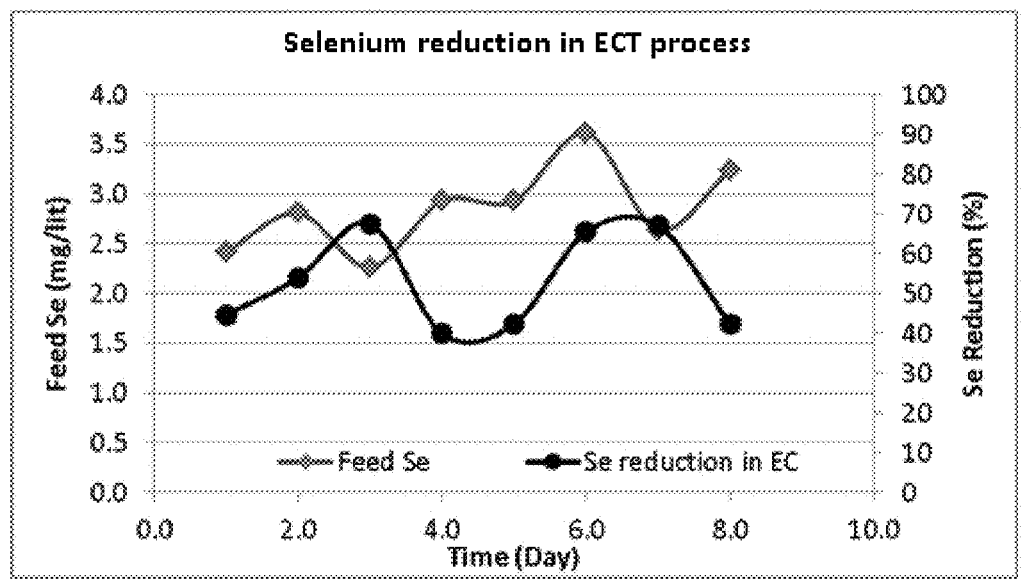
FIG. 27 is a plot of selenium reduction in an ECT process.

Preconditioning through an ECT process not only controls and reduces ORP of feed water but it also helps in reduction of selenium from the feed water. Reduction of selenium through EC process is shown in FIG. 27.

EXAMPLE 5

In this case the wastewater treated through method described in Example 4 is treated by biological processing. Because of removal of high amounts of the ORP contributing components in the pretreatment stage, biological processing was getting consistent feed water quality. And it improved biological process performance in terms of ORP stabilization and also improved selenium reduction. Selenium in final outlet observed to be <0.01 ppm. ORP obtained through biological process after pretreatment is tabulated in Table 12:

TABLE 12

ORP of biological process with ECT treated water as feed

| | ORP (mV) | | |
| Day | C1 | C2 | C3 |
|---|---|---|---|
| 1 | −36 | −285 | −385 |
| 2 | −38 | −421 | −363 |
| 3 | −26 | −335 | −384 |
| 4 | −20 | −413 | −416 |
| 5 | +4 | −411 | −387 |
| 6 | −57 | −361 | −352 |

Selenium reduction in biological process is tabulated in Table 13:

TABLE 13

Selenium reduction from biological process using EC treated water as feed

| | Selenium (mg/lit) | | | |
| | | Product | | |
| Day | Feed | C1 | C3 | C3 |
|---|---|---|---|---|
| 1 | 0.92 | 0.106 | 0.056 | <0.01 |
| 2 | 1.01 | 0.136 | 0.019 | <0.01 |
| 3 | 2.23 | 0.122 | 0.025 | <0.01 |
| 4 | 2.18 | 0.076 | <0.01 | <0.01 |
| 5 | 2.61 | 0.036 | 0.01 | <0.01 |
| 6 | 1.95 | 0.112 | 0.024 | <0.01 |

CONCLUSION

This is a novel integrated process for removal of selenium and nitrate, which provides consistent results and meets or exceeds the requirement of discharge standards for FGD waste water and also takes care of variations in the feed water including highly oxygenated water The combination of ECT process after any pretreatment and single or multi-stage biological process with the novel porous biological media reduce the retention time and fool print to an unexpectedly lower levels. . The Process described in present invention introduces a porous natural media as biofilm carrier to form permanent biofilm over and within the structure for this challenging application. A periodic backwashing of column does remove extra sludge formed and elemental selenium but film formed over media remains attached to the media because of the unique behavior of the media, which helps in maintaining consistent selenium and nitrate reduction from the system. The process also defines a treatment method for the media to reduce its activation time, which accelerates process performance and media efficiency and its capacity to hold bio mass.

The concentration of carbon source and redox condition of the columns plays a key role to achieve consistent reduction of selenium and nitrate. The process in present invention also provides a method for pretreatment of wastewater to stabilize ORP and achieve consistent ORP in biological system. It also provides method for post treatment of outlet from the biological process to remove excess suspended solids and soluble carbon content.

The integrated process provides a cost effective and sustainable solution for removal of selenium, nitrite and other contaminants like heavy metals.

Persons of skill in the art will recognize that the invention is susceptible to various modifications and alterations, which may be considered to be within the scope of this disclosure. All documents recited herein are hereby incorporated by reference, if any document incorporated by reference contradicts or appears to contradict anything explicitly written in this specification, then this specification shall control.

We claim:

1. A method for removing nitrate from wastewater, comprising:
    preconditioning wastewater containing nitrate, by a process comprising:
    adjusting a pH of the wastewater to between 6.0 and 8.5;
    removing precipitated inorganic salts from the wastewater by filtration;
    electrochemically treating the wastewater to decrease the amount of at least one of oxygenated compounds and oxygen radicals, thereby reducing an oxidation reduction potential of the wastewater;
    following the electrochemical treatment, treating the wastewater in at least one of a clarifier and a filter;
    treating the wastewater in at least one column, said column packed with a porous media providing a surface for growth and maintenance of a biofilm upon and in the porous media, wherein said porous media is a chemically treated walnut shell media having a bulk density of 600 to 1000 $Kg/m^3$ and a particle size from 0.5 to 5.0 mm, wherein said biofilm reduces nitrate to form nitrogen gas; and
    releasing the nitrogen gas from the at least one column into the environment.

2. The method of claim 1, further comprising adding a carbon source to the wastewater upstream of the at least one column.

3. The method of claim 1, wherein the walnut shell media is treated with an alkali prior to inclusion in the at least one column.

4. The method of claim 1, further comprising filtering the wastewater subsequent to treatment in the at least one column.

5. The method of claim 4, wherein the filtering is accomplished by at least one of media filtering, aerobic biological process and membrane filtration.

6. The method of claim 1, further comprising physical and/or chemical treatment of the wastewater prior to treatment in the at least one column, wherein the physical treatment is clarification and the chemical treatment is pH adjustment and desaturation.

7. The method of claim 1, wherein the oxidation reduction potential exiting the electrochemical process is reduced to less than but not including 0 mV.

8. The method of claim 1, wherein the electrochemical treatment operates at a current density between 5 $A/m^2$ and 30 $A/m^2$.

9. The method of claim 1, wherein the wastewater is flue gas desulfurization blowdown water from a power plant.

10. The method of claim 1, wherein the treatment in the column packed with a porous media has a hydraulic retention time between 30 and 60 minutes.

11. A method for treatment of wastewater from a flue gas desulfurization process, comprising:
    providing wastewater from a flue gas desulfurization process, said wastewater comprising nitrate;
    removing suspended solids from the wastewater;
    adjusting a pH of the wastewater to between 6.0 and 8.5;
    removing precipitated inorganic salts from the wastewater by filtration;
    electrochemically treating the wastewater to decrease the amount of at least one of oxygenated compounds and oxygen radicals, thereby reducing an oxidation reduction potential of the wastewater;
    treating the wastewater in at least one of a clarifier and a filter;
    treating the wastewater containing nitrate in at least one column, said column packed with a porous media providing a surface for growth and maintenance of a biofilm upon and in the porous media, wherein the porous media is a chemically treated walnut shell media having a bulk density of 600 to 1000 $Kg/m^3$ and a particle size from 0.5 to 5.0 mm, wherein said biofilm reduces nitrate to form nitrogen gas;
    backwashing said at least one column to remove an excess biomass from the column, wherein said backwashing does not diminish bioactivity of the biofilm growing upon and in the porous media; and
    performing at least one of discharging and recycling the treated wastewater.

12. The method of claim 11, further comprising filtering the wastewater subsequent to treatment in the at least one column.

* * * * *